(12) United States Patent
Shibano et al.

(10) Patent No.: US 11,200,008 B2
(45) Date of Patent: Dec. 14, 2021

(54) IMAGE FORMING APPARATUS, RECORDING MEDIUM, AND CONTROL METHOD WITH PROBLEM SOLVING GUIDANCE

(71) Applicant: SHARP KABUSHIKI KAISHA, Sakai (JP)

(72) Inventors: Hiromasa Shibano, Sakai (JP); Sohichi Yoshimura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/134,205

(22) Filed: Dec. 25, 2020

(65) Prior Publication Data

US 2021/0224003 A1    Jul. 22, 2021

(30) Foreign Application Priority Data

Jan. 16, 2020  (JP) .............................. JP2020-005288

(51) Int. Cl.
*G06F 3/12* (2006.01)

(52) U.S. Cl.
CPC .......... *G06F 3/1204* (2013.01); *G06F 3/1238* (2013.01); *G06F 3/1256* (2013.01); *G06F 3/1257* (2013.01)

(58) Field of Classification Search
None
See application file for complete search history.

(56) References Cited

U.S. PATENT DOCUMENTS

| 6,577,761 | B1 | 6/2003 | Kanno et al. |
| 8,390,861 | B2* | 3/2013 | Okada ................... G06F 3/1256 358/1.15 |
| 2003/0231241 | A1* | 12/2003 | Iida ..................... H04N 1/00145 348/207.99 |

FOREIGN PATENT DOCUMENTS

JP    2000-175035 A    6/2000

* cited by examiner

*Primary Examiner* — Thomas D Lee
(74) *Attorney, Agent, or Firm* — ScienBiziP, P.C.

(57) ABSTRACT

An image forming apparatus includes a CPU. After a print image is printed on a sheet, the CPU determines whether a print result is dissatisfactory. When it is determined that the print result is dissatisfactory, the image forming apparatus provides support to resolve the quality mismatch indicating the difference between the actual print quality and the print quality desired by the user.

9 Claims, 19 Drawing Sheets

FIG. 9

RESOLUTION LOG TABLE 300

| MISMATCH CONTENT | RESO-LUTION METHOD | OUTPUT CONDITION A | ... | OUTPUT CONDITION J | CLASSI-FICATION INFOR-MATION | SELEC-TION COUNT |
|---|---|---|---|---|---|---|
| A | 1-1 | 3 | ... | 0 | ABC | 3 |
| B | 2-1 | 4 | ... | 1 | ABB | 4 |
| A | 1-2 | 5 | ... | 1 | BCB | 1 |
| ⋮ | ⋮ | ⋮ | ⋮ | ⋮ | ⋮ | ⋮ |

FIG. 18

RESOLUTION LOG TABLE 300

| MISMATCH CONTENT | RESO-LUTION METHOD | ENVI-RONMENT INFOR-MATION | FEATURE INFOR-MATION | OUTPUT CONDITION A | ... | OUTPUT CONDITION J | CLASSI-FICATION INFOR-MATION | SELEC-TION COUNT |
|---|---|---|---|---|---|---|---|---|
| A | 1-1 | ABB | ACC | 3 | ... | 0 | ABC | 3 |
| B | 2-1 | BCD | DDD | 4 | ... | 1 | ABB | 4 |
| A | 1-2 | BBB | CBC | 5 | ... | 1 | BCB | 1 |
| ... | ... | ... | ... | ... | ... | ... | ... | ... |

IMAGE FORMING APPARATUS, RECORDING MEDIUM, AND CONTROL METHOD WITH PROBLEM SOLVING GUIDANCE

BACKGROUND OF THE INVENTION

Field of the Invention

The present invention relates to an image forming apparatus, a recording medium, and a control method, and particularly relates to, for example, an image forming apparatus, a recording medium, and a control method, for performing image processing on the image to be printed and outputting the image having undergone the image processing to a sheet with an image outputter.

Description of the Background Art

Japanese Patent Application Publication No. 2000-175035 discloses an example of the above kind of background technology. In an image forming apparatus disclosed in Japanese Patent Application Publication No. 2000-175035, a parameter for the image quality adjustment made by the user and a feature value of a document are stored and, based on these pieces of information, an image quality parameter for the image quality adjustment desired by the user is set. An image is processed based on the set image quality parameter, and the image having undergone image processing is output to a sheet.

With this kind of image forming apparatus, the result of the print image, which is the image printed on the sheet, may be different from the result desired by the user. In such a case, the settings of the output conditions may be changed, and the print image may be printed on a sheet again. However, users who are unfamiliar with the operation of the image forming apparatus have difficulty in understanding how the settings of the output conditions affect a print image, and it is complicated and time-consuming for the user to perform the operation to change the settings of the output conditions as appropriate.

Thus, a primary object of the present invention is to provide a novel image forming apparatus, recording medium, and control method.

Another object of the present invention is to provide an image forming apparatus, a recording medium, and a control method, with which it is possible to reduce the loads on a user when the setting of the output condition is changed in accordance with the printing result.

SUMMARY OF THE INVENTION

A first invention is an image forming apparatus including: an image generator that performs image processing on an input image and generates an output image in accordance with an output condition; an image former that prints a print image corresponding to the output image on a recording medium in accordance with the output condition; a result determiner that determines whether a user is dissatisfied with a print in accordance with an action of the user when the print image is printed on the recording medium; a method presenter that, when it is determined that the user is dissatisfied and content of an appearance feature of the print that is a possible cause of dissatisfaction of the user is input, presents, to the user, a resolution method based on the content of the appearance feature, the resolution method including information about the output condition used to resolve dissatisfaction of the user in past; and a setting changer that changes the output condition based on the resolution method selected by the user.

A second invention according to the first invention includes: a monitor that monitors a usage environment of the image forming apparatus; and a first information acquirer that, when the content of the appearance feature is input, acquires environment information indicating a current usage environment, in accordance with an operation of the user, before the resolution method is presented to the user.

A third invention according to the second invention includes: an image reader that generates a read image based on a document; and a second information acquirer that, when the content of the appearance feature is input, acquires feature information from a read image, generated by the image reader based on reading the print as a document, before the resolution method is presented to the user, in accordance with an operation of the user.

A fourth invention according to the first invention is that the image generator generates an output image based on the output condition changed by the setting changer, and when an output image based on the output condition changed by the setting changer is generated, the image former executes test printing of at least a print image corresponding to the output image on a recording medium.

A fifth invention according to the fourth invention includes: a screen display that presents a screen; and a screen controller that, when an output image based on the output condition changed by the setting changer is generated, causes the screen display to present a preview screen including at least the output image.

A sixth invention according to the first invention includes: an attribute determiner that determines an attribute of the user when an output image based on the output condition changed by the setting changer is generated and a print image corresponding to the output image is printed on a recording medium; an application target presenter that presents, to the user, an application target of the output condition changed by the setting changer in accordance with the attribute of the user when the attribute of the user is determined; and a default setter that, when the application target of the output condition changed by the setting changer is selected, sets each setting value of the output condition as default for the output condition corresponding to the selected application target.

A seventh invention according to the sixth invention further includes an authentication determiner that determines whether the user is authenticated when an output image based on the output condition changed by the setting changer is generated and a print image corresponding to the output image is printed on a recording medium, wherein the attribute determiner determines the attribute of the user when the user is authenticated.

An eighth invention according to the first invention includes: a communicator that communicates with another apparatus; a data generator that, when an output image based on the output condition changed by the setting changer is generated and a print image corresponding to the output image is printed on a recording medium, generates update data for increasing an accuracy of the resolution method to be presented to the user; and a transmitter that, when the update data is generated, transmits the update data to another apparatus.

A ninth invention is a computer-readable recording medium having stored therein a control program executed by an image forming apparatus including an image former that prints a print image corresponding to an output image on a recording medium in accordance with an output condition, the control program causing a processor of the image forming apparatus to execute a process including: an image generation step of performing image processing on an input image and generating an output image in accordance with an output condition; a result determination step of determining whether a user is dissatisfied with a print having a print image corresponding to the output image printed thereon in accordance with an action of the user when the print image is printed on a recording medium; a method presentation step of, when it is determined that the user is dissatisfied and content of an appearance feature of the print that is a possible cause of dissatisfaction of the user is input, presenting, to the user, a resolution method based on the content of the appearance feature, the resolution method including information about the output condition used to resolve dissatisfaction of the user in past; and a setting change step of changing the output condition based on the resolution method selected by the user.

A tenth invention is a control method for an image forming apparatus including an image former that prints a print image corresponding to an output image on a recording medium in accordance with an output condition, the control method including: (a) performing image processing on an input image and generating an output image in accordance with an output condition; (b) determining whether a user is dissatisfied with a print having a print image corresponding to the output image printed thereon in accordance with an action of the user when the print image is printed on a recording medium; (c) when it is determined that the user is dissatisfied and content of an appearance feature of the print that is a possible cause of dissatisfaction of the user is input, presenting, to the user, a resolution method based on the content of the appearance feature, the resolution method including information about the output condition used to resolve dissatisfaction of the user in past; and (d) changing the output condition based on the resolution method selected by the user.

According to the present invention, it is possible to reduce the loads on the user when the setting of the output condition is changed in accordance with the printing result.

The above-described object of the present invention and other objects, features, and advantages are more apparent from the following detailed description of embodiments with reference to the drawings.

BRIEF DESCRIPTION OF THE DRAWINGS

FIG. 9 is a table illustrating an example of a resolution log table;

FIG. 18 is a table illustrating an example of a resolution log table according to the second embodiment.

DESCRIPTION OF THE PREFERRED EMBODIMENTS

First Embodiment

Figure 1:
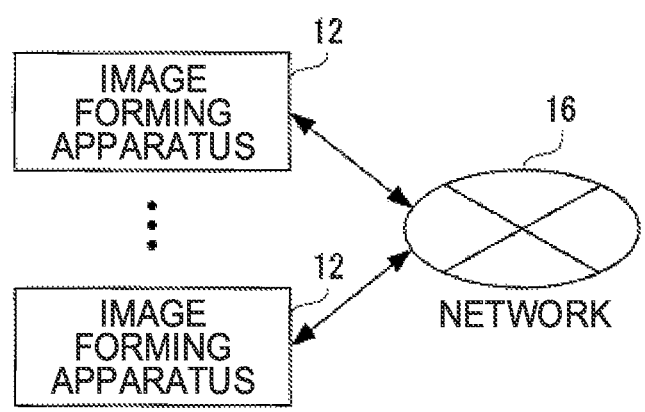
FIG. 1 is a diagram illustrating an example of the configuration of an information processing system.

FIG. 1 is a diagram illustrating an example of the configuration of an information processing system 10 according to a first embodiment. As illustrated in FIG. 1, the information processing system 10 includes a plurality of image forming apparatuses 12.

The image forming apparatuses 12 are connected to each other via a network 16. The network 16 may be configured by using a telephone network (a public telephone network or a mobile phone communication network), the Internet, a local area network (LAN), etc.

The connection to the network 16 may be wired or wireless. Each of the image forming apparatuses 12 may be directly connected to each other.

Figure 2:
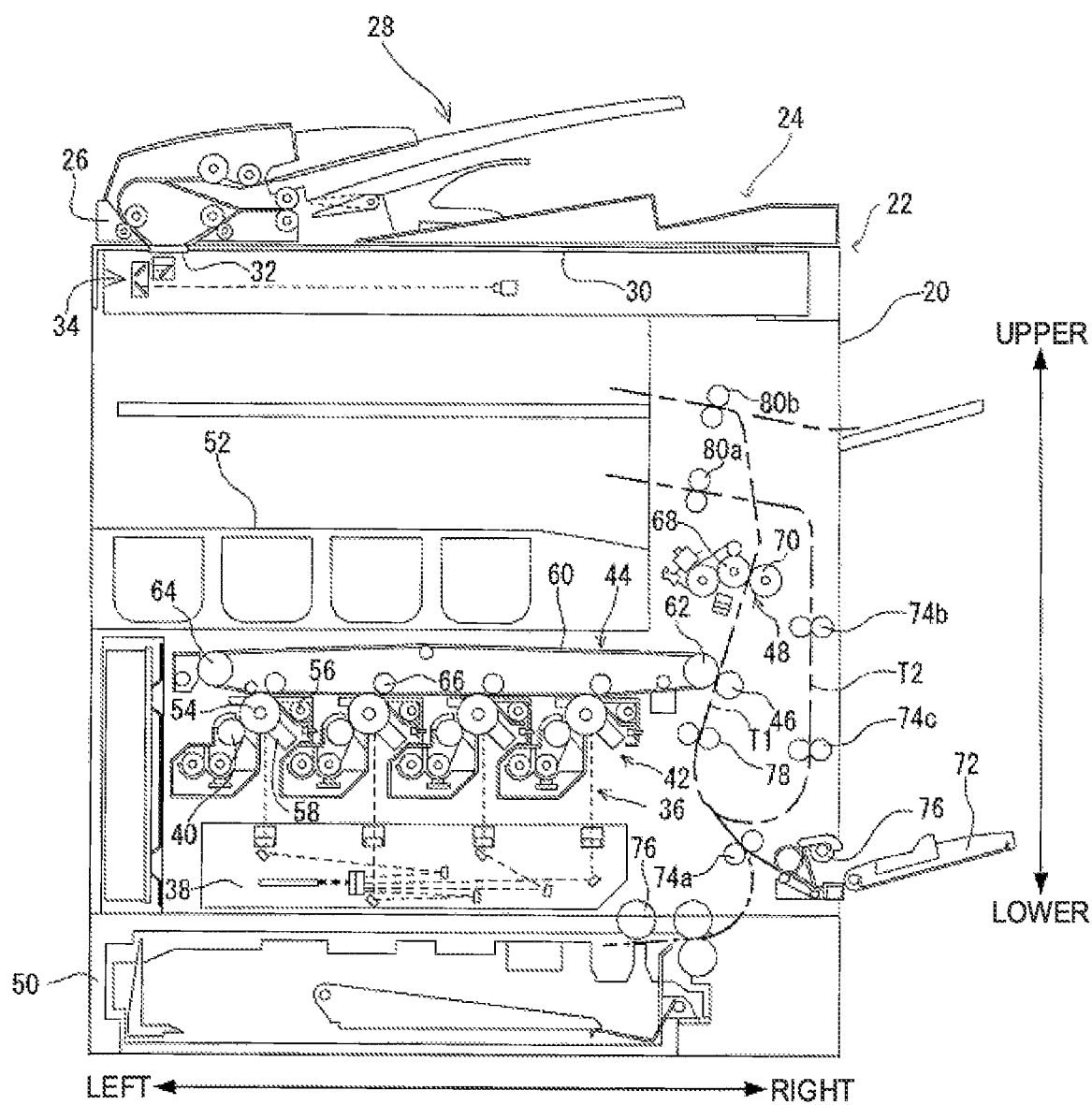
FIG. 2 is a schematic configuration diagram of an entire image forming apparatus when viewed from the front.

FIG. 2 is a schematic configuration diagram of the entire image forming apparatus 12 illustrated in FIG. 1 when viewed from the front and, here, the configuration thereof is described to the extent necessary. The image forming apparatus 12 is a multifunction peripheral (MFP) that has a copier function, a printer function, a scanner function, a facsimile function, etc. The present invention is applicable to not only multifunction peripherals but also other image forming apparatuses such as duplicate machines (copiers), printing devices (printers), and facsimile machines.

As illustrated in FIG. 2, the image forming apparatus 12 includes an apparatus main body 20, an image reading unit 22 located above the apparatus main body 20, and an image former 36 built in the apparatus main body 20.

The image reading unit 22 includes a housing 24 having a rectangular flat-plate shaped bottom plate and side walls rising from the peripheral edge of the bottom plate. The housing 24 includes a document pressing cover (opening and closing portion) 26 that is provided in the upper portion of the apparatus main body 20 and is attached via a hinge, or the like, so as to be opened and closed. The document pressing cover 26 includes an auto document feeder (ADF) 28 that automatically feeds sheets one by one.

A document placement table 30 made of a transparent material is provided on the top surface of the apparatus main body 20. The documents fed by the ADF 28 are read one by one at an image reading position 32.

The image reading unit 22 includes an image reader 34 including a light source, mirrors, an imaging lens, a line sensor, etc. In the image reader 34, the document surface is exposed with light from the light source, and the light reflected by the document surface is guided by the mirrors to the imaging lens. Then, the reflected light is focused by the imaging lens onto light receiving elements of the line sensor. In the line sensor, the luminance and the chromaticity of the reflected light focused onto the light receiving elements are detected, and the image (read image) based on the image on the document surface is generated. A charge coupled device (CCD), a contact image sensor (CIS), or the like, is used as a line sensor.

A scanner including a light source and mirrors are fixedly positioned below the image reading position 32 to scan a document fed by the ADF 28 and is moved in the sub-scanning direction to scan a document placed on the document placement table 30. The sub-scanning direction is the right-left direction when the image forming apparatus 12 is viewed from the front, i.e., the right-left direction in FIG. 2. The main scanning direction is the front-back direction of the image forming apparatus 12 when the image forming apparatus 12 is viewed from the front, i.e., the direction perpendicular to the paper surface of FIG. 2.

Although not illustrated in FIG. 2, a control panel is provided on the front side of the document placement table 30. The control panel includes a display 112, a touch panel 114, etc., illustrated in FIG. 3.

The image former 36 includes an exposure unit 38, a developing device 40, a process unit 42, an intermediate transfer belt unit 44, a transfer roller 46, a fixing unit 48, etc. The image former 36 forms the image (print image) corresponding to the output image for forming a toner image (electrostatic latent image) on a recording medium (sheet) conveyed from a sheet feed cassette 50, or the like, and discharges (outputs) the sheet (print) having an image formed thereon to a sheet ejection tray 52. Although an image is formed on a sheet that is paper according to the present embodiment, a sheet other than paper, such as OHP film, may be used as a recording medium. An input image is used as an output image. Examples of the input image correspond to a read image and an image input (image received) from an external computer.

The image data processed by the image forming apparatus 12 correspond to various images in four colors of black (K), cyan (C), magenta (M), and yellow (Y). Therefore, four developing devices 40, four photoconductor drums 54, four cleaner units 56, and four charging devices 58 are provided to form four types of latent images corresponding to the respective colors so as to form four image stations.

The photoconductor drum 54 is an image carrier having a cylindrical conductive base substrate with a photosensitive layer formed on the surface thereof, and the charging device 58 is a member that charges the surface of the photoconductor drum 54 with a predetermined potential (e.g., −600 V). The exposure unit 38 is configured as a laser scanning unit (LSU) including a laser emitter, a reflective mirror, and the like, to expose the surface of the charged photoconductor drum 54 with light so as to form the electrostatic latent image corresponding to the output image, on the surface of the photoconductor drum 54. The developing device 40 develops the electrostatic latent image formed on the surface of the photoconductor drum 54, in toner of four colors (YMCK). The cleaner unit 56 uses a cleaning blade to remove the residual toner on the surface of the photoconductor drum 54 after development and image transfer and then conveys the removed toner to a waste toner box (not illustrated).

The intermediate transfer belt unit 44 includes an intermediate transfer belt 60, a drive roller 62, a follower roller 64, four intermediate transfer rollers 66, etc. The intermediate transfer belt 60 is provided to be in contact with each of the photoconductor drums 54 so that the toner images in the respective colors formed on the respective photoconductor drums 54 are sequentially transferred onto the intermediate transfer belt 60 in a superimposed manner by using the intermediate transfer roller 66 to form a multicolored toner image on the intermediate transfer belt 60. A transfer roller 46 is provided near the drive roller 62 and, when a sheet is passed through the nip area between the intermediate transfer belt 60 and the transfer roller 46, the toner image formed on the intermediate transfer belt 60 is transferred onto the sheet.

The fixing unit 48 includes a heat roller 68 and a pressure roller 70. The temperature (fixing temperature) of the surface of the heat roller 68 is set to be a predetermined temperature and, when a sheet is passed through the nip area between the heat roller 68 and the pressure roller 70, the toner image transferred on the sheet is melted, mixed, and pressed so that the toner image is thermally fixed to the sheet.

The apparatus main body 20 includes a first sheet conveyance path T1 for conveying a sheet placed on the sheet feed cassette 50, a manual feed tray 72, or the like, to a first sheet ejection tray 52 via the transfer roller 46 and the fixing unit 48. The apparatus main body 20 further includes a second sheet conveyance path T2 for, when two-sided printing is performed on a sheet, returning the sheet having undergone one-sided printing and having passed through the fixing unit 48 to a sheet conveyance path on the upstream side of the transfer roller 46 in the sheet conveying direction. The first sheet conveyance path T1 and the second sheet conveyance path T2 include conveyance rollers 74 (74a, 74b, and 74c) for assisting the conveyance of a sheet, as appropriate.

When one-sided printing is performed by the apparatus main body 20, sheets placed on the sheet feed cassette 50, or the like, are guided one by one by a pick-up roller 76 to the first sheet conveyance path T1 and are conveyed to a registration roller 78 by the conveyance roller 74a. The registration roller 78 conveys the sheet to the transfer roller 46 at such timing that the leading edge of the sheet matches the leading edge of the image information on the intermediate transfer belt 60 so that the toner image is transferred onto the sheet. Then, when the sheet is passed through the fixing unit 48, unfixed toner on the sheet is melted and fixed with heat, and the sheet is ejected to the sheet ejection tray 52 via a sheet ejection roller 80a or a sheet ejection roller 80b.

Figure 3:
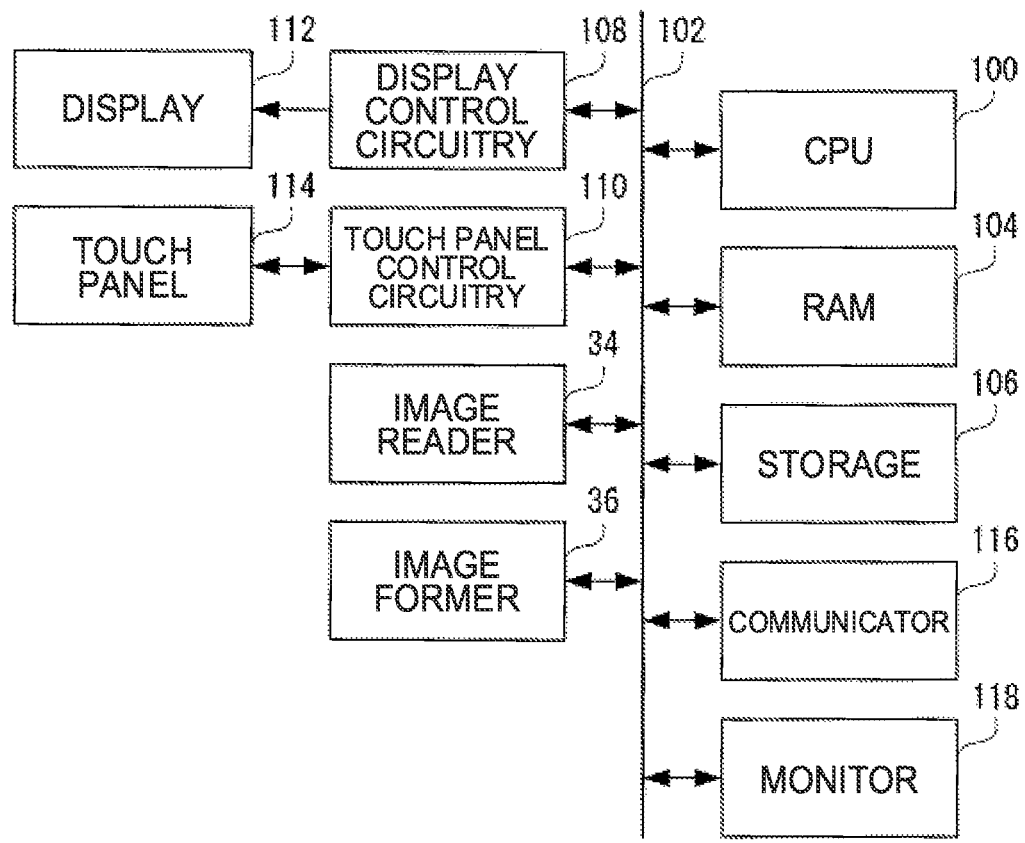
FIG. 3 is a block diagram illustrating an electrical configuration of the image forming apparatus.

FIG. 3 is an example of a block diagram illustrating an electrical configuration of the image forming apparatus 12 according to an embodiment of the present invention.

The image forming apparatus 12 includes a CPU 100, and the CPU 100 is coupled to a RAM 104, a storage 106, a display control circuitry 108, a touch panel control circuitry 110, the image reader 34, the image former 36, a communicator 116, and a monitor 118 via a bus 102.

The display control circuitry 108 is coupled to the display 112, and the touch panel control circuitry 110 is coupled to the touch panel 114.

The CPU 100 performs the overall control on the image forming apparatus 12. The RAM 104 is used as a work area and a buffer area of the CPU 100.

The storage 106 is a primary storage device of the image forming apparatus 12, and a non-volatile memory such as an HDD or an EPPROM is used. The storage 106 may be configured to include the RAM 104. The storage 106 stores, for example, the data for a control program for the CPU 100 to control an operation of each unit of the image forming apparatus 12, display image generation data 504b (see FIG. 11) that is image data for various screens, and the data necessary to execute a control program.

The display control circuitry 108 includes a GPU, a VRAM, etc. so that, in accordance with an instruction from the CPU 100, the GPU generates, in the VRAM, display images for displaying various screens on the display 112 using the display image generation data stored in the RAM 104 and outputs the generated display image to the display 112. For example, an LCD or an electro-luminescence (EL) display may be used as the display 112.

The touch panel control circuitry 110 applies the necessary voltage to the touch panel 114, detects a touch operation or a touch input within the touch effective range of the touch panel 114, and outputs the touch coordinate data indicating the position of the touch input to the CPU 100.

The touch panel 114 is a general-purpose touch panel, and any type such as a capacitive type, an electromagnetic induction type, a resistive type, or an infrared type may be used. According to the first embodiment, a touch panel of a capacitive type is used as the touch panel 114, and the touch panel 114 is provided on the display surface of the display 112. A touch panel display having integrated therein the display 112 and the touch panel 114 may be used.

The communicator 116 includes, for example, a communication module such as a network interface card (NIC) or a communication circuitry for connecting to the network 16 by wire or wirelessly to perform communications via the network 16 in accordance with an instruction from the CPU 100. The communicator 116 transmits and receives data in accordance with, for example, a wired communication method that conforms to a communication standard such as Ethernet (registered trademark) or a wireless communication method that conforms to a communication standard such as IEEE 802.11.

The monitor 118 includes, for example, various sensors that monitor the usage environment, which is the environment where the image forming apparatus 12 is used, and a circuitry that inputs a result based on each sensor, to the CPU 100.

Specifically, the usage environment includes the temperature (space temperature) and the humidity (space humidity) of the space inside the housing of the image forming apparatus 12. Therefore, a space temperature sensor that detects the space temperature and a space humidity sensor that detects the space humidity are provided in the housing of the image forming apparatus 12.

The space temperature sensor is a general-purpose temperature sensor. For example, a contact type temperature sensor such as a thermistor, a thermocouple, a bimetal, or a resistance temperature detector is used as the space temperature sensor.

The space humidity sensor is a general-purpose humidity sensor. For example, a variable capacitance humidity sensor or a variable resistance humidity sensor is used.

The space temperature may be a space temperature within a predetermined range centering around the image forming apparatus 12. In this case, the predetermined range is a range in which the space temperature similar to the space temperature in the housing of the image forming apparatus 12 is detected.

Therefore, the space temperature sensor may be provided outside the housing of the image forming apparatus 12 as long as the space temperature falls within the predetermined range. The same applies to the space humidity and the space humidity sensor.

A temperature/humidity sensor having a space humidity sensor and a space temperature sensor integrated therein may be used. The usage environment may include either one of the space temperature and the space humidity.

In the image forming apparatus 12 configured as described above, an input image is subjected to image processing in accordance with the output conditions of the image forming apparatus 12 so that an output image is generated from the input image.

After the output image is generated, the print image corresponding to the output image is printed on a sheet in accordance with the output conditions of the image forming apparatus 12. Hereinafter, the output condition of the image forming apparatus 12 is simply referred to as "output condition".

The output conditions include the conditions (processing conditions) regarding the image processing to generate an output image from an input image and the conditions (operating conditions) for an operation of the image former 36 to print a print image.

The processing conditions are, for example, luminance, density, contrast, saturation, or sharpness.

For example, the setting of low sharpness increases the amount of blur in an output image and results in the blurred edge of an image element (multiple types of elements such as characters, figures, lines, or photographs) in the output image.

The setting of high sharpness reduces the amount of blur in an output image and results in the clear edge of an image element in the output image.

The setting of high sharpness sometimes causes a striped pattern (moire) in an output image, especially, a photograph in an output image, for example. Furthermore, the setting of high sharpness sometimes causes a fine spot (noise) in an output image, especially in the background of an output image, for example.

The density is the index indicating the density of the entire output image. The setting of high density increases the density of the entire output image. On the other hand, the setting of low density decreases the density of the entire output image.

The setting of low density sometimes causes an unnatural density change (unevenness) in an output image. Furthermore, some of image elements in an output image may be scratched or not appear (white clipping).

Saturation is the index indicating the clearness of a color. The setting of low saturation decreases the clearness of the color of the entire output image and results in the output image in a color close to gray. On the other hand, the setting of high saturation improves the clearness of the color of the entire output image and results in the output image in a color close to a pure color.

Contrast is the index indicating the difference in the luminance of an output image, and the setting of low contrast reduces the difference in the luminance between a bright part and a dark part in the output image. On the other hand, the setting of high contrast increases the difference in the luminance between a bright part and a dark part of the output image.

As described above, the processing condition affects the result (image quality) of an output image. As the print image according to the present embodiment corresponds to the output image, the print image also has the appearance features of the output image (hereinafter referred to as "appearance features"), such as the amount of blur, the luminance, or the color, which may be recognized through the human vision.

Furthermore, even when the output images are based on the identical input image, the appearance features that occur in the images will be varied if the processing conditions are different. Therefore, the processing condition affects the print quality that is the result of a print image.

The operating condition is the fixing temperature that affects the amount of heat applied to a sheet and the speed (conveying speed) at which a sheet is conveyed. When the amount of heat applied to a sheet in the fixing unit 48 is lower than the amount of heat necessary to sufficiently fix the toner to the sheet, the toner is not fixed stably.

When the toner is not fixed stably, the density of the print image is decreased. That is, the same phenomenon as when the low density is set may occur in the print image. As described above, the operating condition may affect the print quality.

The amount of heat applied to a sheet in the fixing unit 48 is determined depending on the fixing temperature and the conveying speed of the sheet passing through the fixing unit 48. Therefore, in the case of a low fixing temperature or a too high conveying speed, the amount of heat applied to a sheet in the fixing unit 48 is decreased.

For example, when the appropriate fixing temperature is not set, specifically, when the fixing temperature is lower than the temperature required to sufficiently fix the toner to the sheet, it takes time for the toner to be sufficiently fixed to the sheet. Therefore, when the fixing temperature is lower than the appropriate set temperature, the sheet passes through the fixing unit 48 before the toner is sufficiently fixed to the sheet.

When the appropriate conveying speed is not set, specifically when the conveying speed is faster than the speed required to sufficiently fix the toner to the sheet, the sheet passes through the fixing unit 48 before the toner is sufficiently fixed to the sheet.

As described above, increasing the amount of heat applied to a sheet may allow the toner to be stably fixed to the sheet. For example, setting a high fixing temperature and/or setting a low conveying speed may increase the amount of heat applied to a sheet.

As described above, the appearance feature of a print image changes in accordance with an output condition. Therefore, even when the print images are based on the identical input image, the appearance features of the print images will be varied if the output conditions are different.

The output condition is previously set by the user with the image forming apparatus 12 when the output image is generated based on the read image. When the output image is generated based on the received image, the output condition is previously set in the terminal that has transmitted the received image, and the data indicating the output condition is transmitted in the same way as the received image.

In the image forming apparatus 12 according to the first embodiment, after the print image is printed on the sheet, it is determined whether the user is dissatisfied with the print (print result) that is previously printed.

It is determined whether the user is dissatisfied in accordance with an action of the user. According to the first embodiment, after the print image is printed on the sheet, the options as to whether the print result is dissatisfactory are presented to the user, and it is determined whether the print result is dissatisfactory in accordance with the user's operation (user's answer).

After the print image is printed on the sheet, the image forming apparatus 12 causes the display 112 to present a determination screen 200, which is a screen used for determining whether the print result is dissatisfactory.

Figure 4:
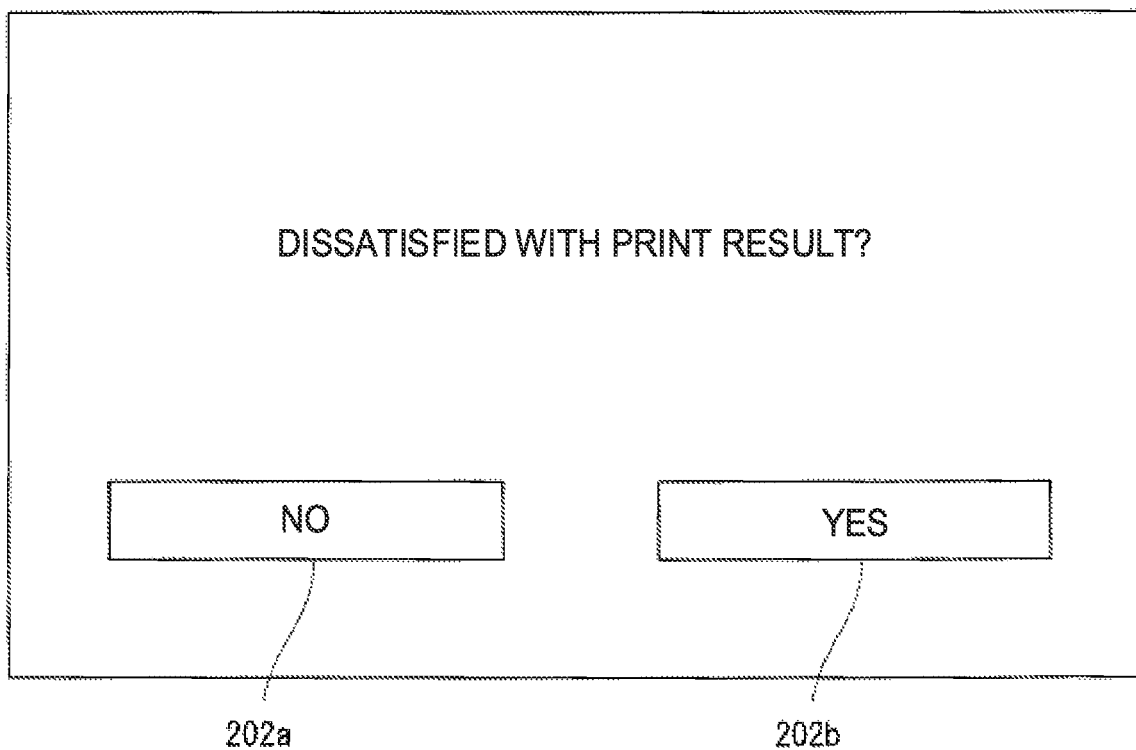
FIG. 4 is a diagram illustrating an example of a determination screen presented on a display of the image forming apparatus.

FIG. 4 is an example of the determination screen 200. The determination screen 200 presents the message asking whether the print result is dissatisfactory. The determination screen 200 includes multiple answer keys 202 (202a and 202b).

Each of the answer keys 202 is provided to determine whether the print result is dissatisfactory. When the answer key 202a is operated, it is determined that the print result is not dissatisfactory. In this case, for example, the display 112 presents a home screen (not illustrated). When the answer key 202b is operated, it is determined that the print result is dissatisfactory.

The determination screen 200 may include only the answer key 202b. In this case, it is determined that the print result is not dissatisfactory when a predetermined time (for example, 10 seconds) has elapsed after the determination screen 200 was displayed on the display 112.

In a case where the image forming apparatus 12 includes a human detecting sensor, it is estimated (determined) that the print result is dissatisfactory when it is detected that the user is present near the image forming apparatus 12 until a predetermined time (for example, 5 seconds) has elapsed after the print image was printed on the sheet.

In a case where the image forming apparatus 12 includes an open/close sensor that detects the opening/closing of the document pressing cover 26, it is determined that the print result is dissatisfactory when the document pressing cover 26 is not opened until a predetermined time (for example, 10 seconds) has elapsed after the output image was printed on the sheet. This applies only when the copy function is enabled.

With the image forming apparatus 12, when it is determined that the print result is dissatisfactory, it is estimated that the appearance of the print image does not correspond to the appearance desired by the user, that is, the actual print quality is different (quality mismatch) from the print quality desired by the user. Therefore, the guide process is performed to provide support so as to resolve the quality mismatch that is the cause of the user's dissatisfaction.

When the guide process is performed, the display 112 presents the guide screen for guiding the resetting (changing) of the output condition.

The guide process is briefly described; first, the content of the cause (quality mismatch) of the user's dissatisfaction is identified. Specifically, the appearance feature of the print (print result) that is the cause of the quality mismatch is identified.

Subsequently, the resolution method for resolving the quality mismatch is presented to the user based on the log (resolution log) of the quality mismatch resolved in the past by the image forming apparatus 12. The resolution method is a method for changing (adjusting) the output condition and includes the information about the output condition used to resolve the user's dissatisfaction in the past. Specifically, the information indicates the adjustment value of the output condition (change condition) that is changed to resolve the quality mismatch in accordance with the content of the quality mismatch. The details of the guide process are described below with reference to FIGS. 5 to 8.

According to the first embodiment, first, the display 112 presents a content input screen 220 (see FIG. 5) for identifying the content of the quality mismatch.

Figure 5:
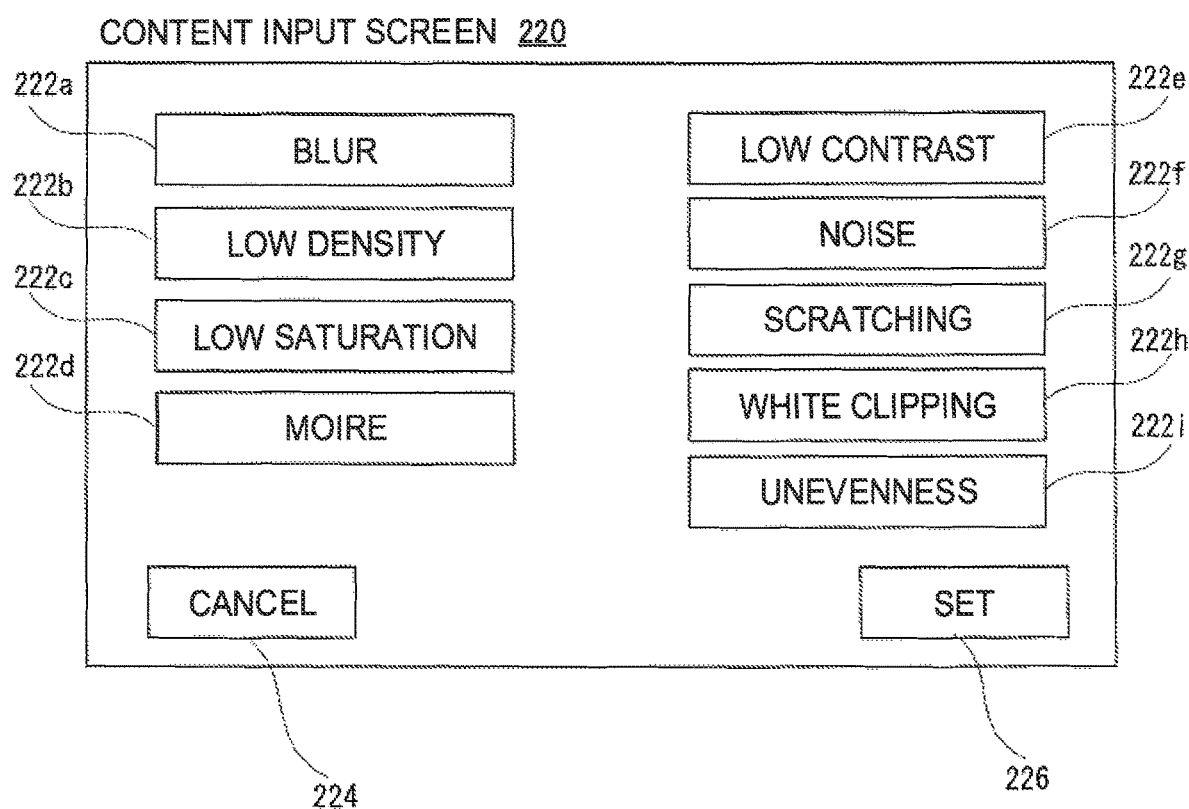
FIG. 5 is a diagram illustrating an example of a content input screen presented on the display of the image forming apparatus.

FIG. 5 is an example of the content input screen 220. The content input screen 220 includes multiple selection keys 222 (222a to 222i), a cancel key 224, and a set key 226.

The cancel key 224 is provided to end the guide process. When the cancel key 224 is operated, the display 112 presents, for example, the home screen.

The set key 226 is provided to input the selected content of the quality mismatch. When the set key 226 is operated, the content of the quality mismatch corresponding to the selected selection key 222 is input. When the content of the quality mismatch is input, the content of the quality mismatch is identified.

Thus, the set key 226 also functions as a content inputter for inputting the content of the quality mismatch. The operation on the set key 226 is unselectable (disabled) until the content of the quality mismatch is selected.

Each of the selection keys 222 is provided to select the content of a quality mismatch, and each of the selection keys 222 is assigned the content of a different quality mismatch. When the selection key 222 is operated, the content of the quality mismatch corresponding to the selection key 222 is selected.

Therefore, the selection key 222 also functions as a content selector that for selecting the content of a quality mismatch. Only one of the selection keys 222 is selectable and, when the predetermined selection key 222 is operated and then a different selection key 222 is operated, the content of the selected quality mismatch is changed to the content corresponding to the operated selection key 222.

Specific examples of the content of a quality mismatch include "blur", "low density", "low saturation", "moire", "low contrast", "noise", "scratching", "white clipping", and "unevenness".

"Blur" refers to the blurred (largely blurred) edge of an image element of the print image, and "low density" refers to the low density (color density) of the entire print image.

"Low saturation" refers to the low saturation (clearness) of the print image, and "moire" refers to the occurrence of an unintended (not present in the input image) pattern such as a striped pattern in the print image.

"Low contrast" refers to the small difference in the luminance (brightness) of the print image, and "noise" refers to the occurrence of a noise (a point, a line, or the like, which does not exist in the input image) in the background area of the print image.

"Scratching" refers to scratching of part of an image element of the print image, "white clipping" refers to not appearing of part of an image element of the print image, and "unevenness" refers to the occurrence of unevenness in the density of the print image.

The content input screen 220 may include, instead of the selection keys 222, a character inputter for inputting a character and a display area for displaying the character input by the character inputter.

The character inputter corresponds to, for example, a keyboard. The character inputter is provided as a software key on the content input screen 220. In this case, when multiple characters are input and then the set key 226 is operated, the content of a quality mismatch is input based on the word, character, or the like, indicating the appearance feature included in the input character string. The method for inputting a character is not particularly limited.

For example, when the character string contains a word such as "low" and "density", "low density" is entered as the content of the quality mismatch. When the character string contains "pattern", "moire" is entered as the content of the quality mismatch. In this case, the character inputter corresponds to a content selector.

When the content of the quality mismatch is identified in response to the input of the content of the quality mismatch, the resolution method corresponding to the content of the quality mismatch is presented to the user. According to the present embodiment, the display 112 presents a method presentation screen 240 that presents the resolution method corresponding to the content of the quality mismatch.

Figure 6:
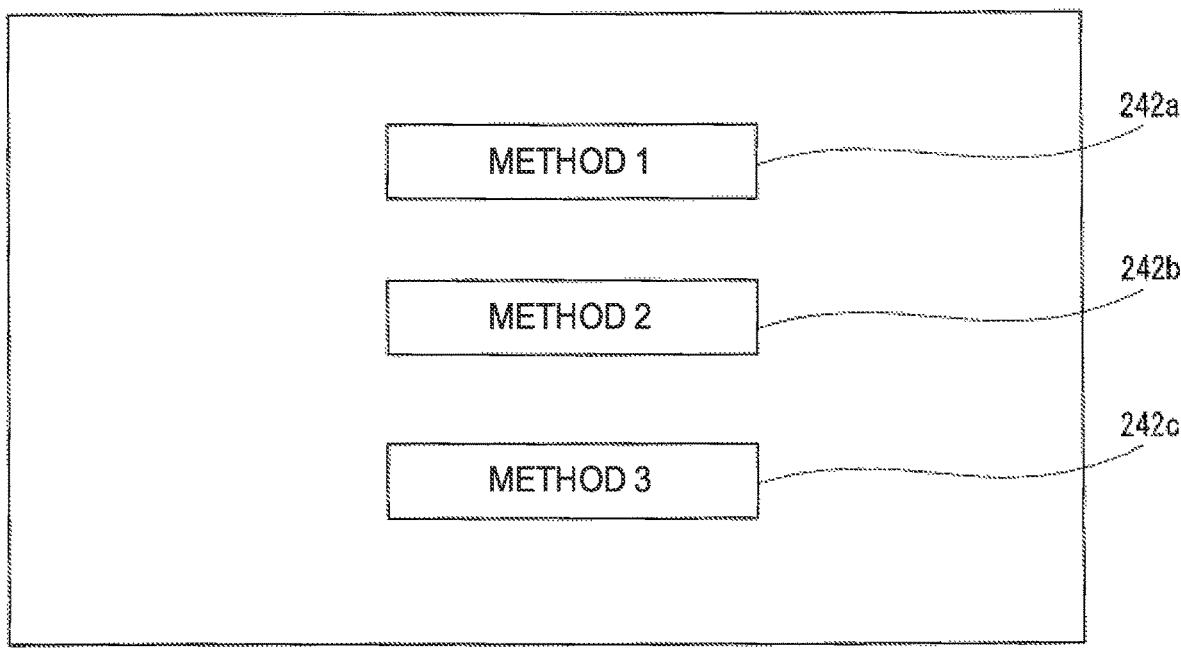
FIG. 6 is a diagram illustrating an example of a method presentation screen presented on the display of the image forming apparatus.

FIG. 6 is an example of the method presentation screen 240. The method presentation screen 240 includes multiple method selection keys 242 (242a to 242c).

Each of the method selection keys 242 is provided to select a resolution method, and each of the method selection keys 242 is assigned a different resolution method. When the method selection key 242 is operated, the setting of the output condition is changed in accordance with the resolution method corresponding to the method selection key 242. That is, the change condition is set.

Therefore, the method selection key 242 also functions as a changer for changing the setting of the output condition or a change condition setter that sets the change condition. When the change condition is set in response to the operation of the method selection key 242, the guide process ends.

For example, when the content of a quality mismatch is identified as "blur", the change condition corresponds to sharpness, and the resolution method includes the method for setting the sharpness higher than the sharpness at the time of the previous printing.

When the content of a quality mismatch is identified as "moire" or "noise", the change condition corresponds to sharpness, and the resolution method includes the method for setting the sharpness lower than the sharpness at the time of the previous printing.

When the content of a quality mismatch is identified as "low density", "scratching", "white clipping", or "unevenness", the change condition corresponds to one or more of the density, the conveying speed, and the fixing temperature, and the resolution method includes the method for changing the processing condition (density) and the method for changing the operating condition (the conveying speed or the fixing temperature).

Specifically, the resolution method includes the method for setting the density higher than the density at the time of the previous printing, the method for setting the conveying speed slower than the conveying speed at the time of the previous printing, and the method for setting the fixing temperature higher than the fixing temperature at the time of the previous printing. The resolution methods presented to the user include one or more of the above specific methods.

When the content of a quality mismatch is identified as "low saturation", the change condition corresponds to saturation, and the resolution method includes the method for setting the saturation higher than the saturation at the time of the previous printing.

When the content of a quality mismatch is identified as "low contrast", the change condition corresponds to luminance, and the resolution method includes the method for setting the luminance higher than the luminance at the time of the previous printing.

When the adjustment value is different even if the change condition is the same, the resolution method is presented to the user as a different resolution method.

When the change condition is set in accordance with the execution of the guide process, the print image corresponding to the changed output condition is printed on the sheet. According to the present embodiment, it is possible to previously check the effect on the print image due to the setting of the change condition, i.e., a change in the appearance feature of the print image.

Specifically, test printing is executed in accordance with the operation by the user, and the print images before and after the setting of the change condition are printed on the sheet.

The print images before and after the setting of the change condition may be printed on different sheets or may be aggregated and printed on a single sheet.

Test printing on a sheet may be executed for at least the print image for which the change condition has been set. The sequential flow after the guide process is executed is described below.

Figure 7:
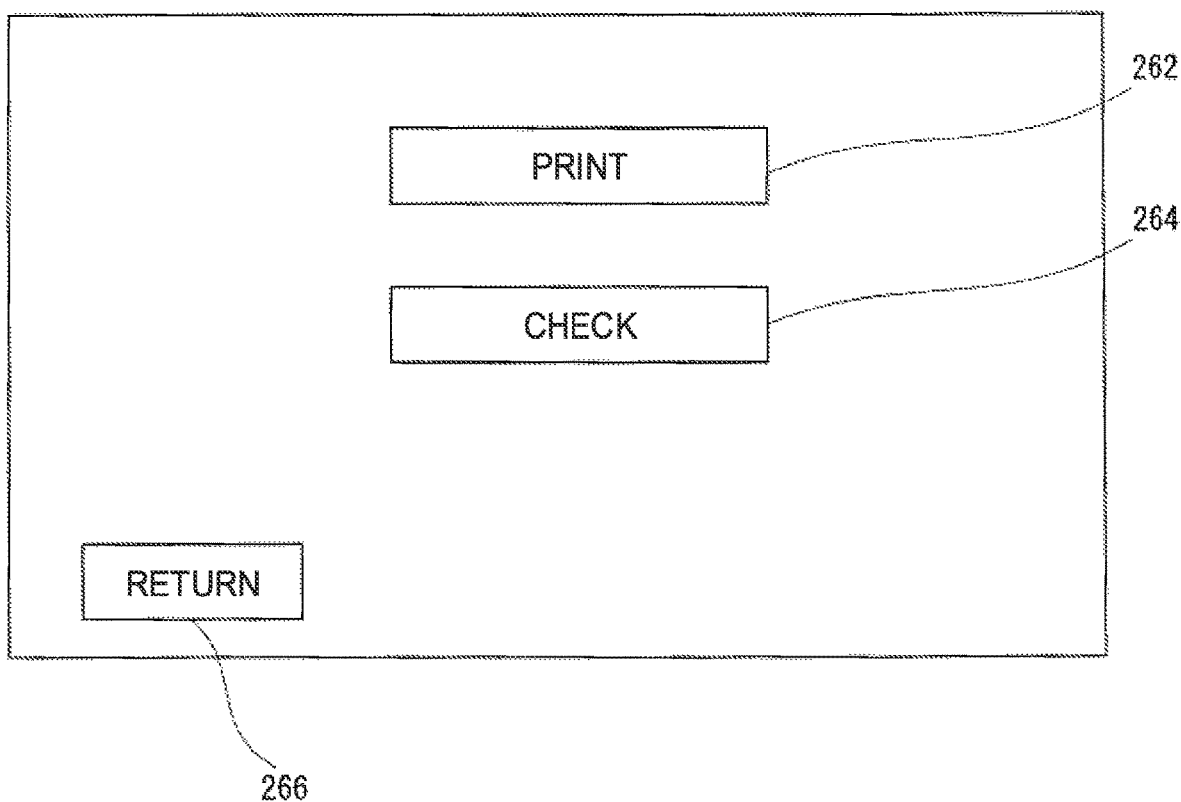
FIG. 7 is a diagram illustrating an example of a print screen presented on the display of the image forming apparatus.

After the guide process is executed, the display 112 presents a print screen 260 for printing a print image on a sheet, as illustrated in FIG. 7. The print screen 260 includes a print key 262, a check key 264, and a return key 266.

The print key 262 is assigned the function of printing a print image on a sheet. When the print key 262 is operated, the print image for which the output condition has been changed is printed on a sheet.

In this case, as the print image for which the output condition has been changed is printed on the sheet, it is determined (estimated) that the quality mismatch has been resolved.

The check key 264 is provided to check a print image. Therefore, the check key 264 also functions as an image checker for checking the effect on the print image due to the setting of the change condition.

When the check key 264 is operated, test printing is executed. That is, at least the print image for which the change condition has been set is printed on the sheet. When test printing of the print image is performed, the display 112 continuously presents the print screen 260.

The return key 266 is provided to select another resolution method. When the return key 266 is operated, the display 112 presents the method presentation screen 240 again.

The print key 262 may be unselectable (disabled) until the check key 264 is operated, that is, until the print image is checked by the user.

The output image corresponding to the print image may be presented on the display 112 so that the effect on the print image due to the setting of the change condition is checked.

In this case, although not illustrated, the print screen 260 includes a preview key for checking, on the screen, the effect on the output image due to the setting of the change condition. Therefore, in this case, the preview key also functions as the above-described image checker.

When the preview key is operated, the display 112 presents a preview screen (check screen) including at least the output image for which the change condition has been set.

On the check screen, the display 112 presents a close key for ending the checking of the output image. When the close key is operated, the display 112 presents the print screen 260 again.

When at least the operating condition is changed in accordance with the execution of the guide process, the preview key may be unselectable (disabled) as it is difficult to check the effect on the print image due to the change in the operating condition in the output image included in the check screen.

According to the present embodiment, in a case where the user has been authenticated after the quality mismatch is resolved, an application target selection process is started to select the target to which the output condition is applied.

The application target selection process is briefly described; the application target of the output condition is presented to the user in accordance with the attribute of the authenticated user.

When the application target of the output condition is selected in response to an operation by the user, each of the setting values of the output conditions are set as default for the output condition corresponding to the selected application target. That is, the output condition after the execution of the guide process is the default for the output condition corresponding to the application target. The application target selection process is not performed if the user authentication is not previously executed. In this case, the output condition returns to the state before the execution of the guide process and, for example, the home screen is presented on the display 112.

According to the present embodiment, the user authentication is executed with the user ID, the password, or the like, input by the user; however, the user authentication may be executed with, for example, a smartphone (mobile terminal) or an IC card when the image forming apparatus 12 has a short-range wireless communication function of, for example, the NFC method or Bluetooth (registered trademark).

After the application target selection process is executed and the attribute of the authenticated user is the administrator of the image forming apparatus 12, the image forming apparatus 12 itself (all the users using the image forming apparatus 12) or the authenticated user (specific user) is selectable as the application target of the output condition. The administrator here refers to a user who holds more than a predetermined position in an organization such as a company.

When the authenticated user is an attribute other than the administrator, the authenticated user is exclusively selectable as the application target of the output condition. The application target selection process is described below.

When the application target selection process is started, the display 112 presents an application target presentation screen 280 that is a screen for presenting the application target of the output condition.

Figure 8:
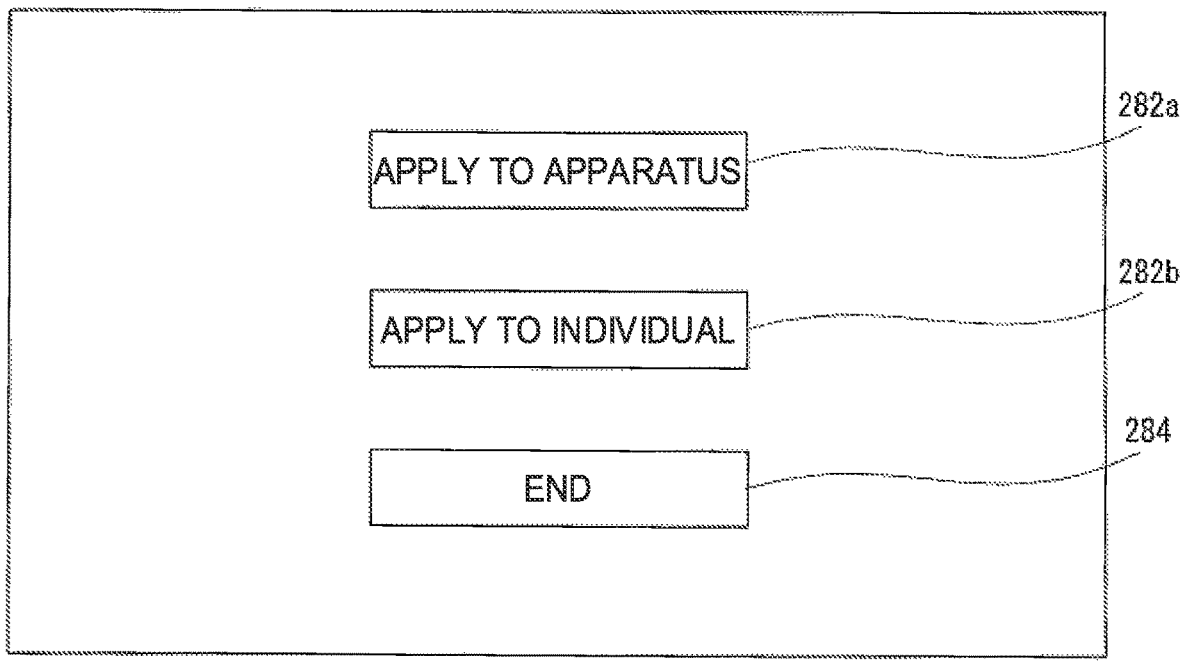
FIG. 8 is a diagram illustrating an example of an application target presentation screen presented on the display of the image forming apparatus.

FIG. 8 is an example of the application target presentation screen 280. The application target presentation screen 280 includes multiple selection keys 282 (282a and 282b) and an end key 284.

The selection key 282 is provided to select the application target of the output condition. Therefore, the selection key 282 also functions as an application selector for selecting the application target of the output condition.

When the selection key 282a is operated, the output condition is applied to the image forming apparatus 12.

Therefore, each of the setting values of the output conditions is set as default for the output condition of the selected image forming apparatus 12.

When the selection key 282*b* is operated, the output condition is applied to the authenticated user. Therefore, each of the setting values of the output conditions is set as default for the output condition corresponding to the selected authenticated user.

When the selection key 282 is operated, the application target selection process ends, and the display 112 presents the home screen. This also applies to a case where the end key 284 is operated.

The end key 284 is provided to end the application target selection process without selecting the application target of the output condition. When the end key 284 is operated, the application target selection process ends. When the end key 284 is operated, the output condition returns to the state before the execution of the guide process.

According to the first embodiment, a resolution method is selected based on a resolution log table 300 indicating a resolution log.

FIG. 9 is an example of the resolution log table 300. In the resolution log table 300 illustrated in FIG. 9, a resolution method, output conditions A to J, classification information, and a selection count are described in relation to mismatch content.

The mismatch content is the content of a quality mismatch. The output conditions A to J are the setting values of the respective output conditions, i.e., the setting values for sharpness, density, etc.

The classification information is the information for classifying the image forming apparatus 12. The classification information is, for example, the information indicating at least one of the firmware version, the model number, and the like, of the image forming apparatus 12. The selection count is the number of times of selection of a resolution method.

A character, a character string, or the like, corresponding to the mismatch content, the resolution method, the output conditions A to J, the classification information, and the selection count are described in each column of the resolution log table 300. These details are merely generated and used for internal processing. Therefore, the details described in each column of the table may be described in symbols, or the like, which are not interpretable by humans.

According to the first embodiment, the resolution log table 300 is referred to so that at least the content of the quality mismatch, i.e., the resolution method corresponding to the mismatch content is selected.

For example, when the number of resolution methods to be presented to the user is limited, the resolution method to be presented to the user may be preferentially selected from the resolution methods corresponding to the content of the quality mismatch based on the output condition when it is determined that the printing result is dissatisfactory.

Specifically, the output conditions at the time of the previous printing are compared with the output conditions based on the resolution log. When the output conditions are compared with each other, the resolution method corresponding to the output conditions close to the output conditions at the time of the previous printing is selected.

The close output conditions are output conditions having an identical setting value or having a setting value with an error of less than a predetermined percentage. Furthermore, the close output conditions may be output conditions that have the identical setting value of the output condition corresponding to at least the change condition and have the identical setting values of other output conditions or the setting values with an error of less than a predetermined percentage.

Furthermore, the resolution method to be presented to the user may be preferentially selected based on the classification information on the apparatus. Specifically, the classification information on the apparatus is compared with the output condition based on the resolution log. When the sets of classification information are compared with each other, the resolution method corresponding to the same classification information as the classification information on the apparatus is preferentially selected.

Still further, the resolution method to be presented to the user may be preferentially selected based on the selection count. Specifically, the resolution method having a higher selection count is preferentially selected from the resolution methods corresponding to the mismatch content.

The resolution method may be preferentially selected from the resolution methods corresponding to the mismatch content, based on two or more items out of the output condition, the classification information, and the selection count.

When the quality mismatch is resolved, new mismatch content, or the like, is described in the resolution log table 300. That is, the resolution log is updated. In a case where the already described content corresponds to the mismatch content, or the like, except for the selection count, the selection count is exclusively updated.

A sample of the content of a quality mismatch, or the like, is previously registered in the resolution log according to the first embodiment. Therefore, a sample of the mismatch content, or the like, is previously described in the resolution log table 300.

When a quality mismatch is resolved, update data is generated to increase the accuracy of the resolution method presented to the user and is transmitted to the other image forming apparatus 12. The update data indicates mismatch content, a resolution method, and the like, except for the selection count.

After receiving the update data, the image forming apparatus 12 updates the resolution log in accordance with the update data as described above. Therefore, in the information processing system 10, each of the image forming apparatuses 12 maintains the latest resolution log.

Figure 10:
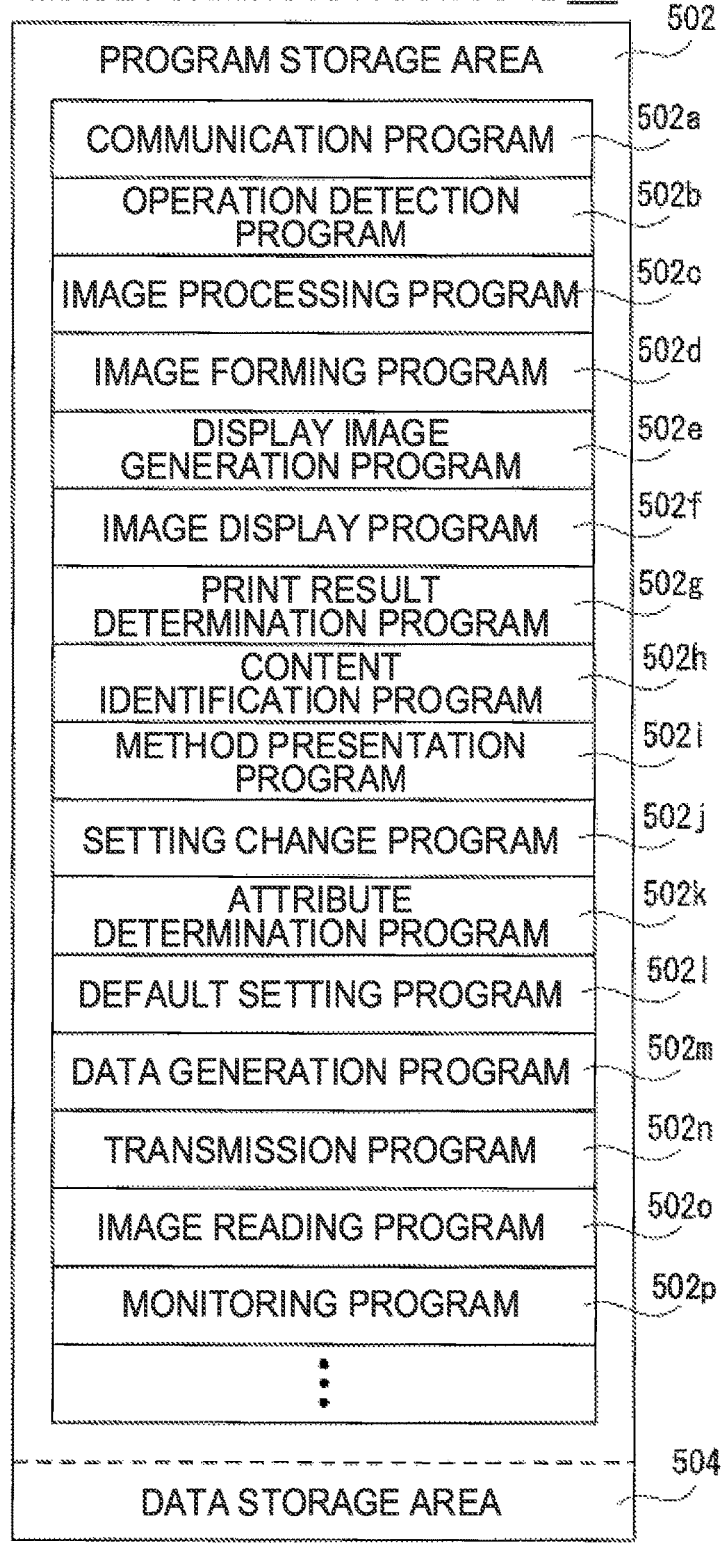
FIG. 10 is a diagram illustrating an example of a memory map of a RAM of the image forming apparatus.
Figure 11:
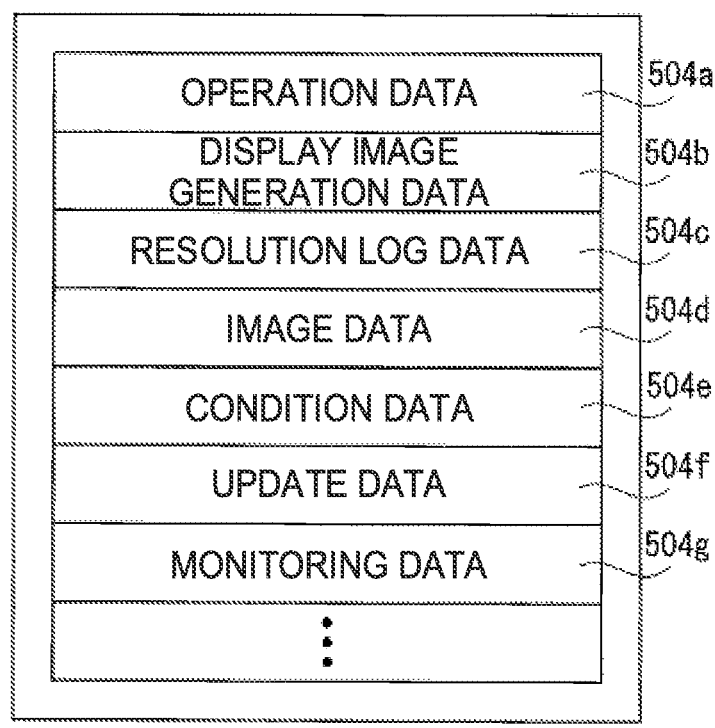
FIG. 11 is a diagram illustrating an example of the details of a data storage area of the RAM of the image forming apparatus.

FIGS. 10 and 11 are diagrams illustrating an example of a memory map 500 of the RAM 104 of the image forming apparatus 12 illustrated in FIG. 1. As illustrated in FIGS. 10 and 11, the RAM 104 includes a program storage area 502 and a data storage area 504. The program storage area 502 of the RAM 104 stores a control program of the image forming apparatus 12 as an example of an information processing program.

The control program of the image forming apparatus 12 includes a communication program 502*a*, an operation detection program 502*b*, an image processing program 502*c*, an image forming program 502*d*, a display image generation program 502*e*, an image display program 502*f*, a print result determination program 502*g*, a content identification program 502*h*, a method presentation program 502*i*, a setting change program 502*j*, an attribute determination program 502*k*, a default setting program 502*l*, a data generation program 502*m*, a transmission program 502*n*, an image reading program 502*o*, and a monitoring program 502*p*.

The communication program 502*a* is a program for controlling the communicator 116 to communicate with other apparatuses.

The operation detection program 502*b* is a program for detecting the operation detection data corresponding to an operation on each operating unit of the image forming apparatus 12. For example, when the touch panel 114 is touched (or operated), the CPU 100 acquires the touch coordinate data output from the touch panel 114 as operation data 504*a* described below in accordance with the operation detection program 502*b* and stores the operation data 504*a* in a buffer. When a hardware button or key such as an operation button is pressed or operated, the CPU 100 acquires the operation data 504*a* based on the pressing or operation of the button or key in accordance with the operation detection program 502*b* and stores the operation data 504*a* in the buffer.

The image processing program 502*c* is a program for performing image processing on an input image based on an output condition to generate an output image.

The image processing program 502*c* also includes a program for performing image processing on an input image based on an output condition to generate an output image when the output condition is changed (when the change condition is set).

The image forming program 502*d* is a program for printing a print image corresponding to an output image, on a sheet based on an output condition.

The image forming program 502*d* also includes a program for executing test printing of at least a print image on a sheet after the change condition is set in response to an operation by the user.

The display image generation program 502*e* is a program for controlling the GPU to generate display images for displaying various screens (e.g., 200, 220, 240, 260, 280, and 300) using the display image generation data 504*b* described below.

The image display program 502*f* is a program for outputting the display image generated in accordance with the display image generation program 502*e*, to the display 112.

The print result determination program 502*g* is a program for determining whether a print result is dissatisfactory in response to an operation by the user after the print image is printed on a sheet.

The content identification program 502*h* is a program with which, after it is determined that the print result is dissatisfactory, the candidates for the content of the quality mismatch that is a possible cause of the user's dissatisfaction are presented to the user and, in accordance with a user's operation, the content of the quality mismatch is identified.

The method presentation program 502*i* is a program for presenting, to the user in accordance with the content of a quality mismatch, multiple resolution methods including the information about the output condition used to resolve the user's dissatisfaction in the past.

The method presentation program 502*i* includes an application target presentation program for presenting the application target of the output condition to the user when the attribute of the authenticated user is determined.

The setting change program 502*j* is a program for changing the output condition (setting the change condition) based on the selected resolution method.

The attribute determination program 502*k* is a program for determining the attribute of the authenticated user when the change condition is set and the quality mismatch is resolved.

The default setting program 502*l* is a program for setting each of the setting values of the output conditions as default for the output conditions corresponding to the selected application target when the application target of the output condition is selected in accordance with the operation by the user.

The data generation program 502*m* is a program for generating update data when a quality mismatch is resolved.

The transmission program 502*n* is a program for transmitting update data to the other image forming apparatus 12 via the communicator 116.

The image reading program 502*o* is a program for controlling the image reader 34 to generate a read image based on a document.

The monitoring program 502*p* is a program for controlling the monitor 118 to monitor the usage environment of the image forming apparatus 12.

Although not illustrated, the program storage area 502 also stores other programs necessary for controlling the image forming apparatus 12. The program storage area 502 stores, for example, the program for receiving a received image, the program for receiving the data indicating the setting of an output condition, the program for receiving update data, the program for updating a resolution log in accordance with update data, the program for updating the resolution log in accordance with the resolution of a quality mismatch, the program for executing user authentication, and the program for determining whether the user has been authenticated.

FIG. 11 is a diagram illustrating an example of the details of the data storage area 504. The data storage area 504 illustrated in FIG. 12 stores the operation data 504*a*, the display image generation data 504*b*, resolution log data 504*c*, image data 504*d*, condition data 504*e*, and update data 504*f*.

The operation data 504*a* are operation data detected in accordance with the operation detection program 502*b* and are stored in chronological order. The operation data 504*a* are used for processing of the CPU 100 and then are deleted.

The display image generation data 504*b* are data including polygon data and texture data for generating display image data. The display image generation data 504*b* also include, for example, image data corresponding to a software key.

The resolution log data 504*c* are data indicating a resolution log. The image data 504*d* are data corresponding to an image.

The image data 504*d* include the data corresponding to an input image and the data corresponding to an output image. The data corresponding to an input image includes the data corresponding to a read image or the data corresponding to a received image.

The condition data 504*e* are the data indicating the default of an output condition in the image forming apparatus 12. The condition data 504*e* include the data indicating the default of the output condition for each user. Further, the condition data 504*e* include the data indicating the current output condition.

The update data 504*f* are the data generated in accordance with the resolution of a quality mismatch and indicate the mismatch content, the resolution method, the output conditions A to J, etc. The monitoring data 504*g* are the data indicating the usage environment of the image forming apparatus.

Although not illustrated, the data storage area 504 stores other data necessary to execute an information processing program, the data necessary for user authentication, and a flag and a counter (timer) necessary to execute the information processing program.

Figure 12:
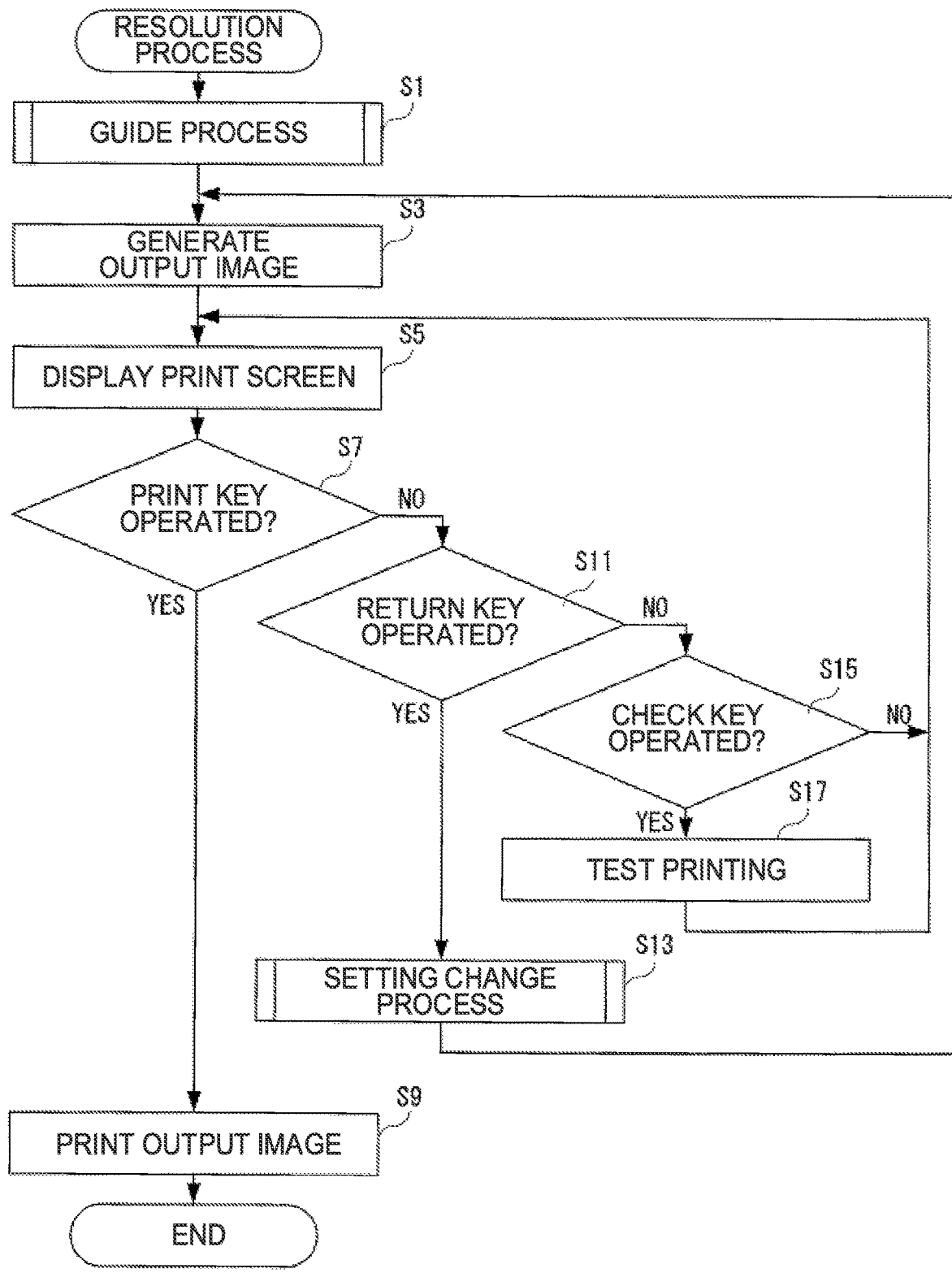
FIG. 12 is a flowchart illustrating an example of a resolution process of a CPU of the image forming apparatus.

FIG. 12 is a flowchart illustrating an example of a resolution process of the CPU 100 of the image forming apparatus 12 illustrated in FIG. 1. The resolution process is started when it is determined that a print result is dissatisfactory.

Figure 13:
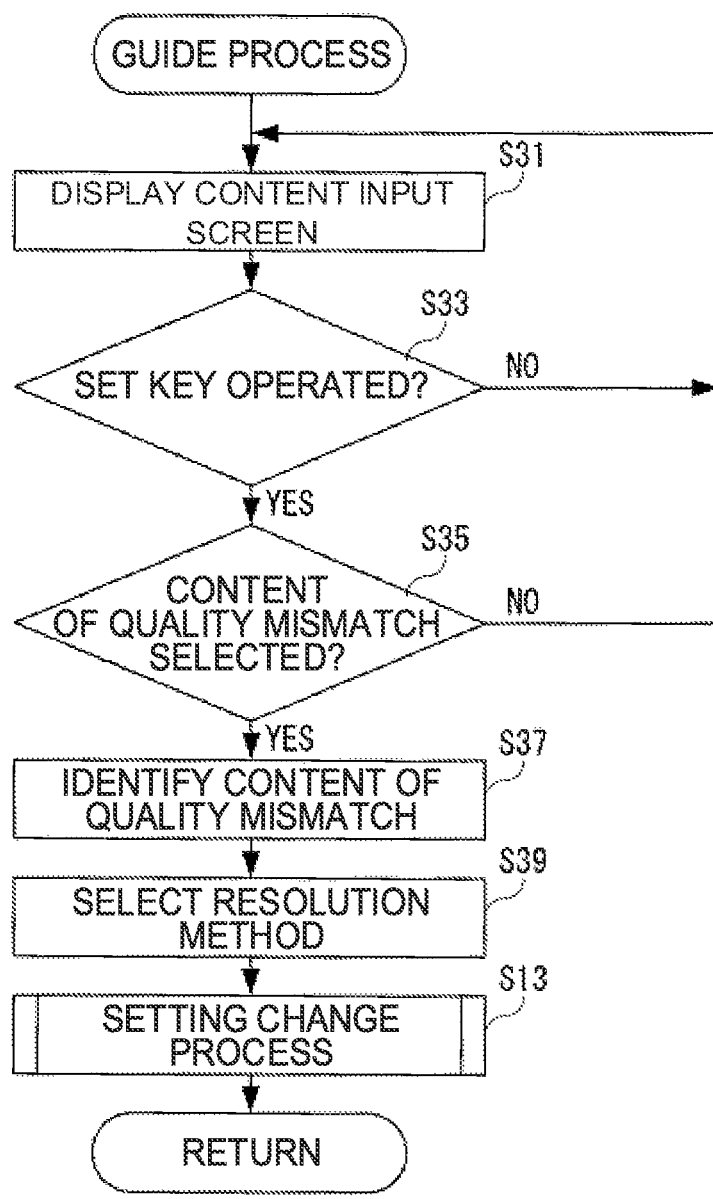
FIG. 13 is a flowchart illustrating an example of a guide process of the CPU of the image forming apparatus.

As illustrated in FIG. 12, the CPU 100 performs the guide process at Step S1 in accordance with the subroutine illustrated in FIG. 13 and then proceeds to Step S3.

At Step S3, an output image is generated in accordance with the output condition, and the print screen 260 is displayed on the display 112 at Step S5.

At Step S7, it is determined whether the print key 262 has been operated. When "YES" at Step S7, i.e., the print key 262 has been operated, the process proceeds to Step S9. At Step S9, the print image is printed on a sheet, and the resolution process ends.

When "NO" at Step S7, i.e., the print key 262 has not been operated, the process proceeds to Step S11.

At Step S11, it is determined whether the return key 266 has been operated. When "NO" at Step S11, i.e., the return key 266 has not been operated, the process proceeds to Step S15. Conversely, when "YES" at Step S11, i.e., the return key 266 has been operated, the setting change process is performed at Step S13 in accordance with the subroutine illustrated in FIG. 14, and the process returns to Step S3.

At Step S15, it is determined whether the check key 264 has been operated. When "NO" at Step S15, i.e., the check key 264 has not been operated, the process returns to Step S5. Conversely, when "YES" at Step S15, i.e., the check key 264 has been operated, the process proceeds to Step S17. At Step S17, test printing is executed and the process returns to Step S5.

FIG. 13 is a flowchart illustrating an example of the guide process of the CPU 100 as described at Step S1 of FIG. 12. When the guide process is started, the CPU 100 causes the display 112 to present the content input screen 220 at Step S31.

At Step S33, it is determined whether the set key 226 has been operated. When "NO" at Step S39, i.e., the set key 226 has not been operated, the process returns to Step S31. Conversely, when "YES" at Step S33, i.e., the set key 226 has been operated, the process proceeds to Step S35.

At Step S35, it is determined whether the content of the quality mismatch has been selected. When "NO" at Step S35, i.e., the content of the quality mismatch has not been selected, the process returns to Step S31. When "YES" at Step S35, i.e., the content of the quality mismatch has been selected, the process proceeds to Step S37.

At Step S37, the content of the quality mismatch is identified and, at Step S39, the resolution method to be presented to the user is selected based on the resolution log, and the process proceeds to Step S13.

Figure 14:
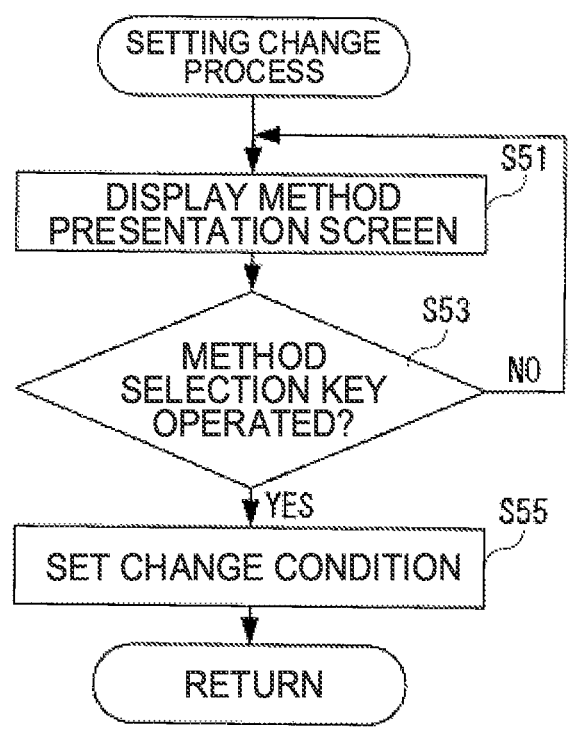
FIG. 14 is a flowchart illustrating an example of a setting change process of the CPU of the image forming apparatus.

At Step S13, the setting change process is performed in accordance with the subroutine illustrated in FIG. 14, and the process returns to the resolution process illustrated in FIG. 12.

FIG. 14 is a flowchart illustrating an example of the setting change process of the CPU 100 as described at Step S13 of the resolution process or the guide process. When the setting change process is started, the CPU 100 causes the display 112 to present the method presentation screen 240 at Step S51 and then proceeds to Step S53.

At Step S53, it is determined whether the method selection key 242 has been operated. When "NO" at Step S53, i.e., the method selection key 242 has not been operated, the process returns to Step S51. Conversely, when "YES" at Step S53, i.e., the method selection key 242 has been operated, the process proceeds to Step S55.

At Step S55, the change condition is set in accordance with the selected resolution method, and the process returns to the resolution process illustrated in FIG. 12 or the guide process illustrated in FIG. 13 as appropriate.

Figure 15:
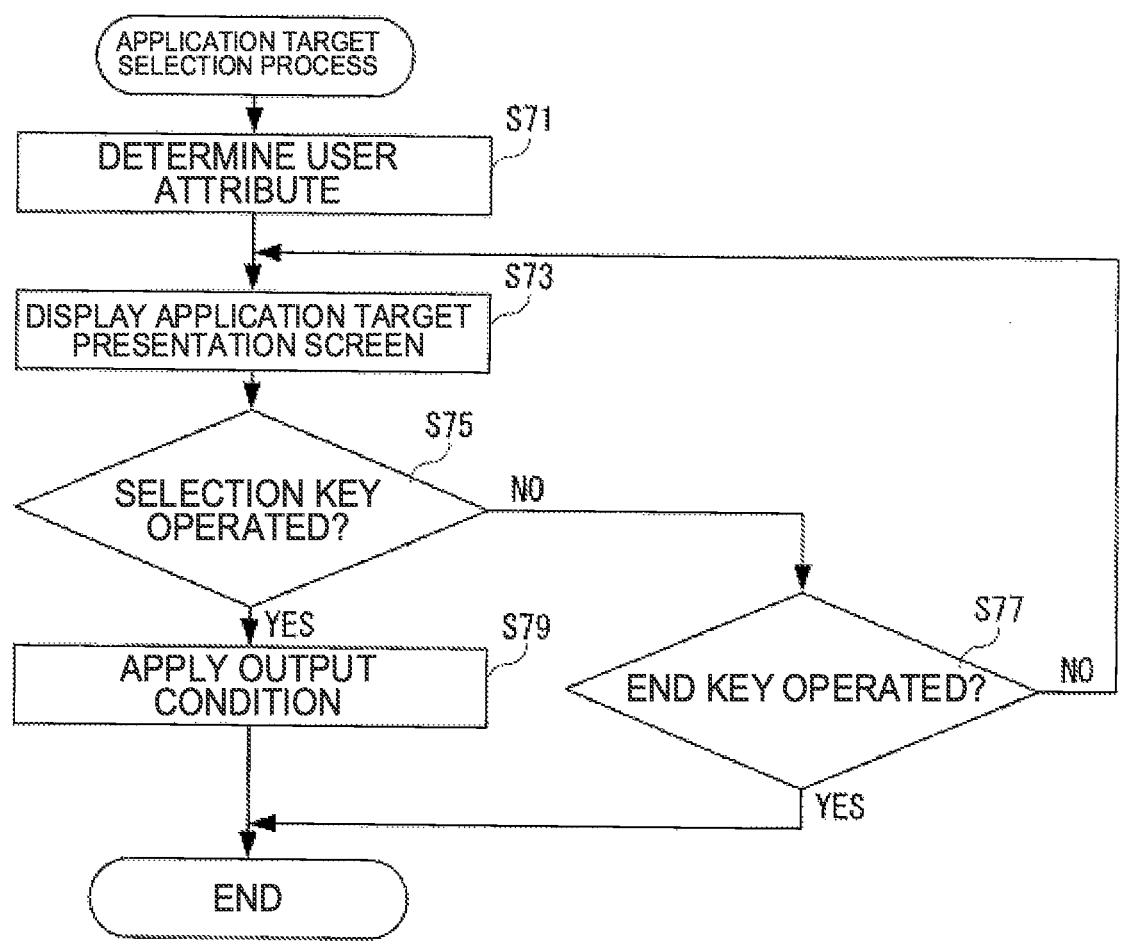
FIG. 15 is a flowchart illustrating an example of an application target selection process of the CPU of the image forming apparatus.

FIG. 15 is a flowchart illustrating an example of the application target selection process of the CPU 100 of the image forming apparatus 12 illustrated in FIG. 1. The application target selection process is started when the quality mismatch is resolved and the user is authenticated.

At Step S71, the attribute of the user is determined, and the process proceeds to Step S73. At Step S73, the display 112 presents the application target presentation screen 280 corresponding to the attribute of the user.

At Step S75, it is determined whether the selection key 282 has been operated. When "NO" at Step S75, i.e., the selection key 282 has not been operated, the process proceeds to Step S77. Conversely, when "YES" at Step S75, i.e., the selection key 282 has been operated, each of the setting values of the output conditions is applied to the application target corresponding to the selected selection key 282 as default settings at Step S79, and the application target selection process ends.

At Step S77, it is determined whether the end key 284 has been operated. When "NO" at Step S77, i.e., the end key 284 has not been operated, the process returns to Step S73. Conversely, when "YES" at Step S77, i.e., the end key 284 has been operated, the application target selection process ends.

According to the first embodiment, when it is determined that a print result is dissatisfactory, the setting of the output condition may be changed as appropriate by simply inputting the content of the quality mismatch. That is, it is possible to reduce the loads on the user when the setting of the output condition is changed in accordance with the print result.

Furthermore, the setting values of the output conditions after the guide process is executed may be set as default for the output conditions of the predetermined application target. Therefore, it is possible to reduce the loads on the user when the print image is printed after the application target selection process is performed.

Second Embodiment

The second embodiment is the same as the first embodiment except that the process performed to identify the content of the quality mismatch and the method for selecting the resolution method have been changed. Therefore, the duplexed descriptions with the first embodiment are omitted.

According to the second embodiment, at least additional information is acquired as needed when the content of a quality mismatch is input.

The additional information is information for selecting the resolution method to be presented to the user (narrowing down the resolution methods to be presented to the user) when the number of resolution methods to be presented to the user is limited. The additional information includes at least the environment information indicating the current usage environment of the image forming apparatus 12. The additional information includes the feature information indicating the feature value of a read image (analysis image) corresponding to the previous print.

The feature information corresponds to, for example, the histogram of density, luminance, hue, and saturation of an analysis image. A series of processes before the acquisition of the additional information is described below with reference to FIGS. 16 and 17.

Figure 16:
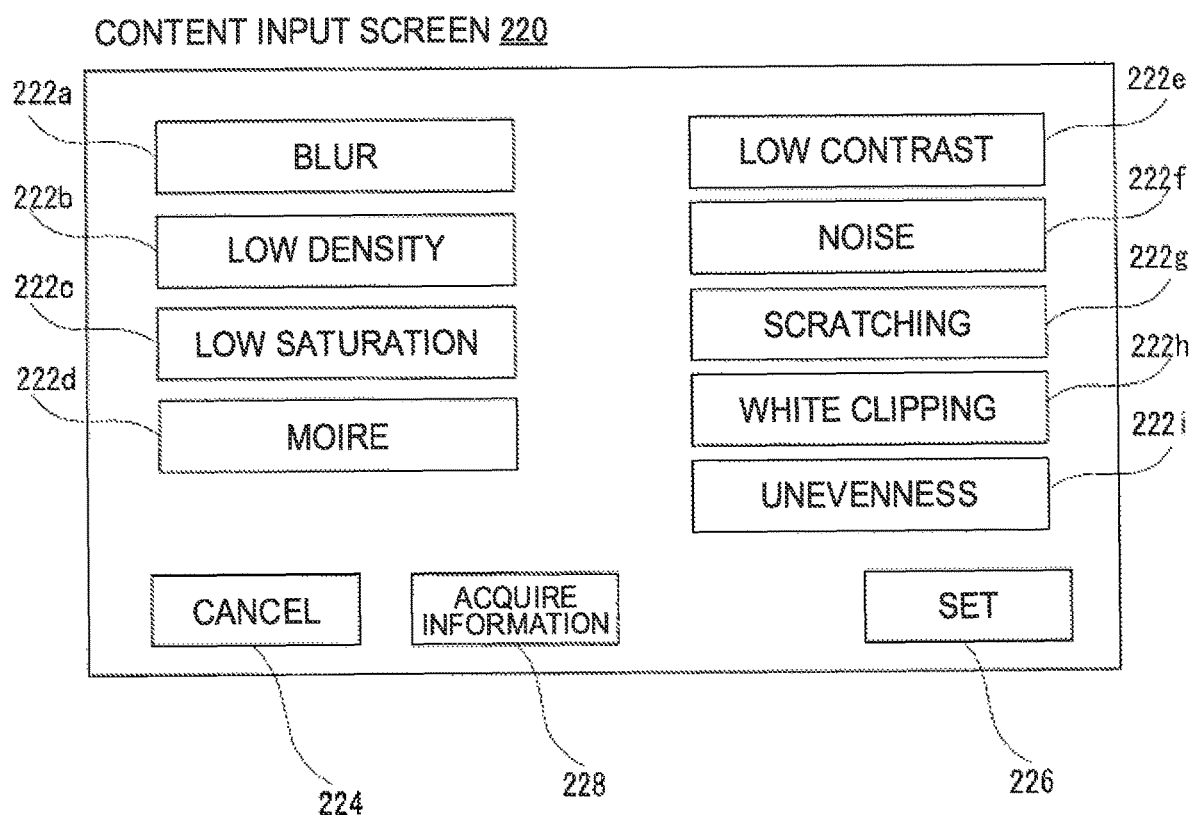
FIG. 16 is a diagram illustrating an example of the content input screen presented on the display of the image forming apparatus according to a second embodiment.

FIG. 16 illustrates the content input screen 220 according to the second embodiment. The content input screen 220 includes an information acquisition key 228.

The information acquisition key 228 is provided to acquire additional information. When the information acquisition key 228 is operated, the display 112 presents a reading screen 320 (see FIG. 17) that prompts the user for the reading of the previous print to perform an image reading process. The environment information is acquired in response to the operation on the information acquisition key 228. The reading screen 320 is one mode of the guide screen.

Figure 17:
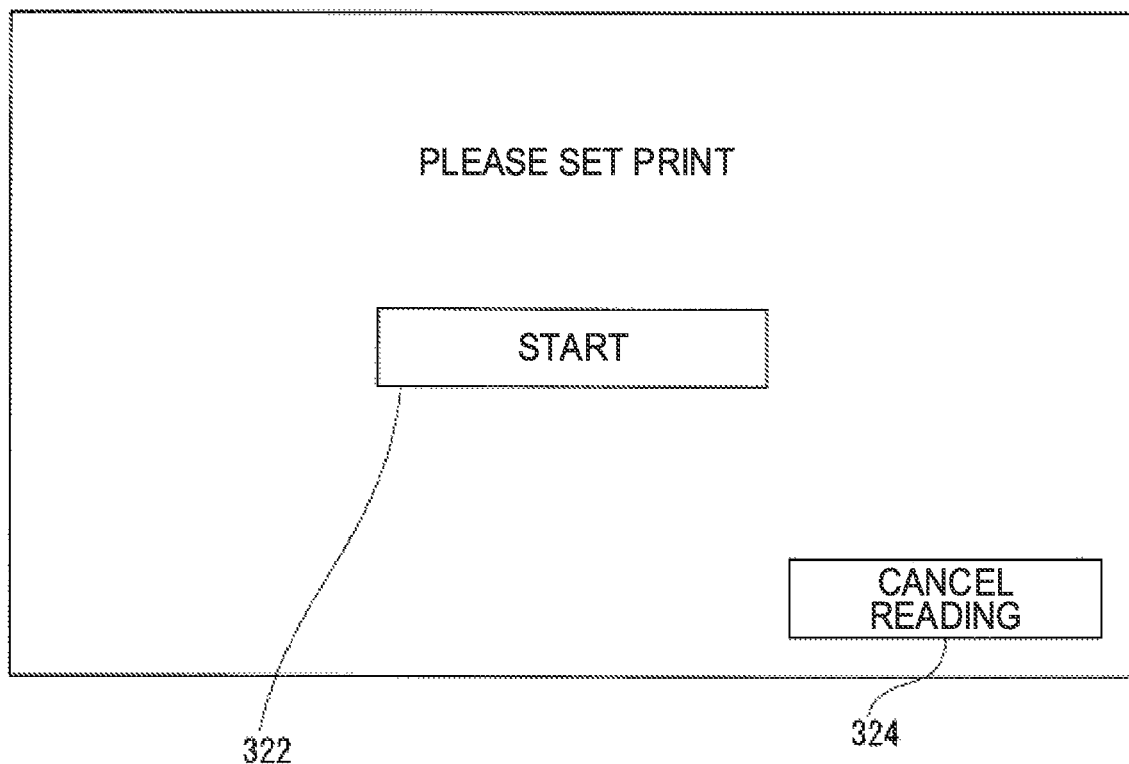
FIG. 17 is a diagram illustrating an example of a reading screen presented on the display of the image forming apparatus according to the second embodiment.

FIG. 17 is an example of the reading screen 320. The reading screen 320 displays the message promoting reading of the previous print by the image reader 34. The reading screen 320 includes a start key 322 and a reading cancel key 324.

The start key 322 is provided to start reading of the previous print. When the start key 322 is operated, the image reader 34 is controlled so as to generate an analysis image. Therefore, the start key 322 also functions as a reading starter. After an analysis image is generated, feature information is acquired from the analysis image.

The reading cancel key 324 is provided to cancel the reading of the previous print. When the reading cancel key 324 is operated, the display 112 presents the content input screen 220. Therefore, when the reading cancel key 324 is operated, the environment information is exclusively acquired as the previous print is not read.

Next, the method for selecting the resolution method to be presented to the user when additional information is acquired is described.

FIG. 18 illustrates the resolution log table 300 according to the second embodiment. In the resolution log table 300 according to the second embodiment, environment information and feature information are newly described in relation to mismatch content. A corresponding character, character string, or the like, is described for the environment information and the feature information.

These details are merely generated and used for internal processing in the same manner as the mismatch content, etc. Therefore, the details described in each column of the resolution log table 300 may be described in symbols, or the like, which are not interpretable by humans.

According to the second embodiment, when the additional information is acquired and the resolution log table 300 is referred to, the resolution method corresponding to at least the mismatch content and the additional information is selected.

That is, when the feature information is acquired, the resolution method corresponding to the mismatch content, the environment information, and the feature information is selected, and when the feature information is not acquired, the resolution method corresponding to the mismatch content and the environment information is selected.

The resolution method to be presented to the user may be preferentially selected from the resolution methods selected based on the mismatch content and the additional information on the basis of the output condition, the classification information, etc.

Although not illustrated, the control program of the image forming apparatus 12 according to the second embodiment includes an information acquisition program.

The information acquisition program is a program for acquiring environment information in accordance with a user's operation.

The information acquisition program also includes a program for acquiring feature information from an analysis image that is a read image based on the pervious print when the print is read as a document in accordance with a user's operation.

The data storage area 504 according to the second embodiment newly stores additional data. The additional data is the data corresponding to the additional information.

The additional data includes at least the data corresponding to the environment information out of the data corresponding to the environment information and the data corresponding to the analysis information.

The image data 504$d$ according to the second embodiment also includes the data corresponding to the analysis image that is the read image corresponding to the print.

Figure 19:
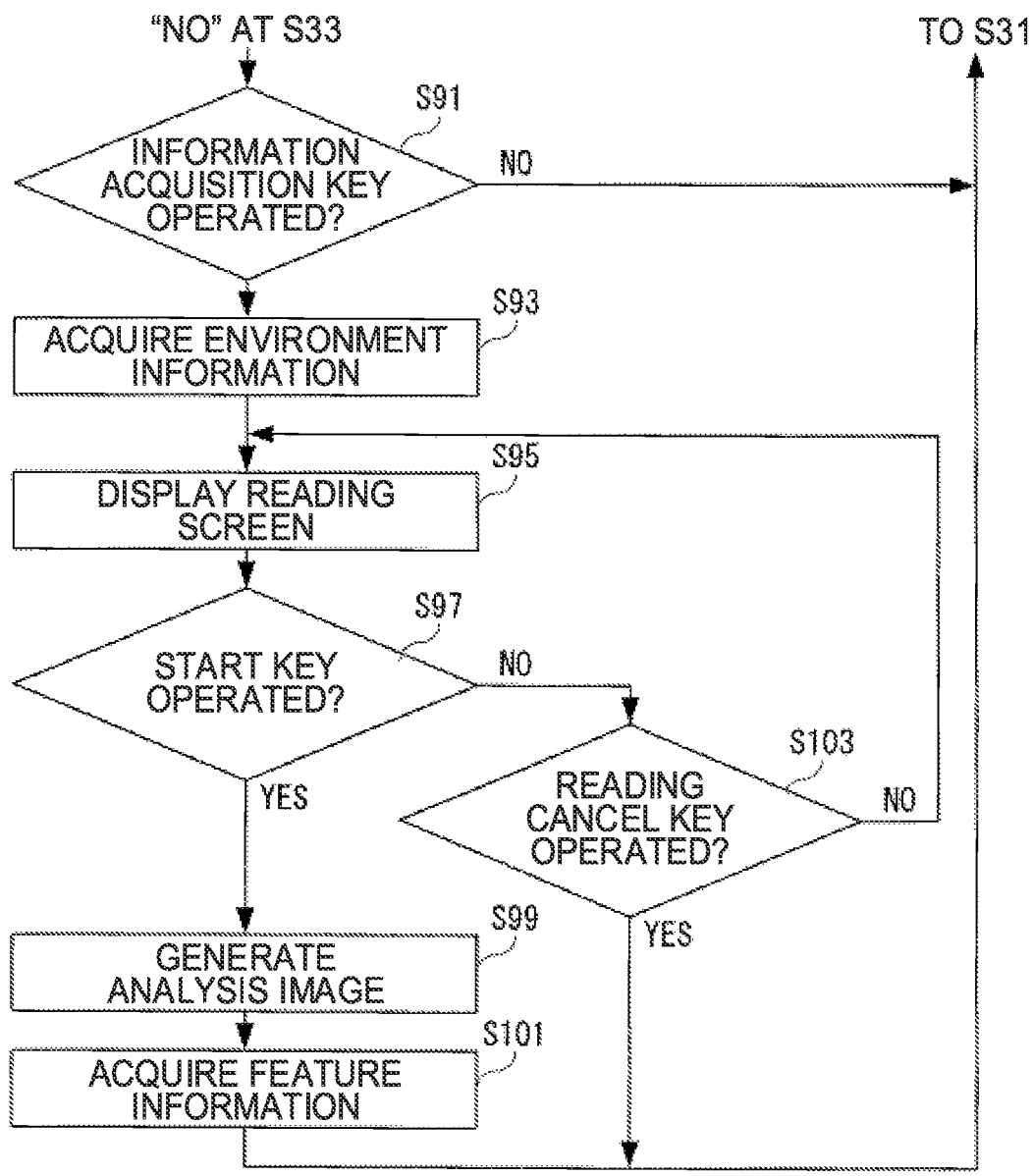
FIG. 19 is a flowchart illustrating a part of an example of a guide process of the CPU of the image forming apparatus according to the second embodiment.

FIG. 19 is a flowchart illustrating a part of an example of the guide process according to the second embodiment. At Step S91, it is determined whether the information acquisition key 228 has been operated. When "NO" at Step S91, i.e., the information acquisition key 228 has not been operated, the process returns to Step S31. Conversely, when "YES" at Step S91, i.e., the information acquisition key 228 has been operated, the process proceeds to Step S93.

At Step S93, environment information is acquired and, at Step 95, the display 112 presents the reading screen 320.

At Step S97, it is determined whether the start key 322 has been operated. When "NO" at Step S97, i.e., the start key 322 has not been operated, the process proceeds to Step S103. Conversely, when "YES" at Step S97, i.e., the start key 322 has been operated, the process proceeds to Step S99.

At Step S99, the print is read and an analysis image is generated. At Step S101, feature information is acquired from the analysis image, and the process returns to Step S31.

At Step S103, it is determined whether the reading cancel key 324 has been operated. When "NO" at Step S103, i.e., the reading cancel key 324 has not been operated, the process returns to Step S95. Conversely, when "YES" at Step S103, i.e., the reading cancel key 324 has been operated, the process returns to Step S31.

According to the second embodiment, as is the case with the first embodiment, it is possible to reduce the loads on the user when the setting of the output condition is changed in accordance with the printing result.

The usage environment may include, for example, the operating time that is the total time during which the image forming apparatus 12 is in operation, the total number of prints, or the remaining amount of toner.

In this case, the monitor 118 includes, for example, a sensor that monitors the operating time, the number of prints, the remaining amount of toner, etc., and a circuit that inputs the result based on each sensor to the CPU 100. As the method for detecting the operating time, or the like, is known, its detailed description is omitted.

When the resolution method is presented to the user, the adjustment value of the output condition (change condition) may be predicted based on the resolution log. In this case, partly, the resolution method indicating the adjustment value of the change condition predicted based on the resolution log is presented to the user. The adjustment value predicted based on the resolution log does not overlap with the adjustment value indicated by the resolution method selected based on the resolution log.

For example, the adjustment value predicted based on the resolution log indicates any value between the largest value and the smallest value of the adjustment value indicated by the resolution method selected based on the resolution log.

The adjustment value predicted based on the resolution log may be a value larger than the largest value of the adjustment value indicated by the resolution method selected based on the resolution log. This, however, applies to exclusively a case where the content of a quality mismatch is the content that is resolved by setting the change condition higher than the previous setting value.

The adjustment value predicted based on the resolution log may be a value smaller than the smallest value of the adjustment value indicated by the resolution method selected based on the resolution log. This, however, applies to exclusively a case where the content of a quality mismatch is the content that is resolved by setting the change condition lower than the previous setting value.

The specific numerical values and screens illustrated in the above embodiments are examples and may be modified as appropriate for the actual product.

The flowcharts illustrated in each of the above embodiments are examples, and the order of steps may be changed as appropriate if the same result is obtained.

What is claimed is:

1. An image forming apparatus comprising:
    an image generator that performs image processing on an input image and generates an output image in accordance with an output condition;
    an image former that prints a print image corresponding to the output image on a recording medium in accordance with the output condition;
    a monitor that monitors a usage environment of the image forming apparatus;
    a result determiner that determines whether a user is dissatisfied with a print in accordance with an action of the user when the print image is printed on the recording medium;
    a method presenter that, when it is determined that the user is dissatisfied and content of an appearance feature of the print that is a possible cause of dissatisfaction of the user is input, presents, to the user, a resolution method based on the content of the appearance feature, the resolution method including information about the output condition used to resolve dissatisfaction of the user in past;
    a first information acquirer that, when the content of the appearance feature is input, acquires environment information indicating a current usage environment, in accordance with an operation of the user, before the resolution method is presented to the user; and
    a setting changer that changes the output condition based on the resolution method selected by the user.

2. The image forming apparatus according to claim 1, further comprising:
    an image reader that generates a read image based on a document; and
    a second information acquirer that, when the content of the appearance feature is input, acquires feature information from a read image generated by the image reader based on reading the print as a document, before the resolution method is presented to the user, in accordance with an operation of the user.

3. The image forming apparatus according to claim 1, wherein
    the image generator generates an output image based on the output condition changed by the setting changer, and
    when an output image based on the output condition changed by the setting changer is generated, the image former executes test printing of at least a print image corresponding to the output image on a recording medium.

4. The image forming apparatus according to claim 3, further comprising:
    a screen display that presents a screen; and
    a screen controller that, when an output image based on the output condition changed by the setting changer is generated, causes the screen display to present a preview screen including at least the output image.

5. The image forming apparatus according to claim 1, further comprising:
    an attribute determiner that determines an attribute of the user when an output image based on the output condition changed by the setting changer is generated and a print image corresponding to the output image is printed on a recording medium;
    an application target presenter that presents, to the user, an application target of the output condition changed by the setting changer in accordance with the attribute of the user when the attribute of the user is determined; and
    a default setter that, when the application target of the output condition changed by the setting changer is selected, sets each setting value of the output condition as default for the output condition corresponding to the selected application target.

6. The image forming apparatus according to claim 5, further comprising an authentication determiner that determines whether the user is authenticated when an output image based on the output condition changed by the setting changer is generated and a print image corresponding to the output image is printed on a recording medium, wherein
    the attribute determiner determines the attribute of the user when the user is authenticated.

7. The image forming apparatus according to claim 1, further comprising:
    a communicator that communicates with another apparatus;
    a data generator that, when an output image based on the output condition changed by the setting changer is generated and a print image corresponding to the output image is printed on a recording medium, generates update data for increasing an accuracy of the resolution method to be presented to the user; and
    a transmitter that, when the update data is generated, transmits the update data to another apparatus.

8. A non-transitory computer-readable recording medium having stored therein a control program executed by an image forming apparatus including an image former that prints a print image corresponding to an output image on a recording medium in accordance with an output condition and a monitor that monitors a usage environment of the image forming apparatus, the control program causing a processor of the image forming apparatus to execute a process comprising:
    an image generation step of performing image processing on an input image and generating an output image in accordance with an output condition;
    a result determination step of determining whether a user is dissatisfied with a print having a print image corresponding to the output image printed thereon in accordance with an action of the user when the print image is printed on a recording medium;

a method presentation step of, when it is determined that the user is dissatisfied and content of an appearance feature of the print that is a possible cause of dissatisfaction of the user is input, presenting, to the user, a resolution method based on the content of the appearance feature, after acquiring environment information indicating a current usage environment, in accordance with an operation of the user, the resolution method including information about the output condition used to resolve dissatisfaction of the user in past; and a setting change step of changing the output condition based on the resolution method selected by the user.

9. A control method for an image forming apparatus including an image former that prints a print image corresponding to an output image on a recording medium in accordance with an output condition and a monitor that monitors a usage environment of the image forming apparatus, the control method comprising:

(a) performing image processing on an input image and generating an output image in accordance with an output condition;

(b) determining whether a user is dissatisfied with a print having a print image corresponding to the output image printed thereon in accordance with an action of the user when the print image is printed on a recording medium;

(c) when it is determined that the user is dissatisfied and content of an appearance feature of the print that is a possible cause of dissatisfaction of the user is input, presenting, to the user, a resolution method based on the content of the appearance feature, after acquiring environment information indicating a current usage environment, in accordance with an operation of the user, the resolution method including information about the output condition used to resolve dissatisfaction of the user in past; and (d) changing the output condition based on the resolution method selected by the user.

* * * * *